United States Patent [19]
Sasaki

[11] Patent Number: 4,860,117
[45] Date of Patent: Aug. 22, 1989

[54] IMAGE PROCESSING METHOD AND SYSTEM USING MULTIPLE IMAGE SENSORS PRODUCING IMAGE DATA SEGMENTS WHICH ARE COMBINED AND SUBJECTED TO OPTICAL PROCESSING

[75] Inventor: Tomio Sasaki, Tokyo, Japan

[73] Assignee: Ricoh Company, Ltd., Tokyo, Japan

[21] Appl. No.: 150,297

[22] Filed: Jan. 29, 1988

[30] Foreign Application Priority Data

Jan. 29, 1987 [JP] Japan .................................. 62-17159
Jan. 29, 1987 [JP] Japan .................................. 62-17158

[51] Int. Cl.$^4$ .................... H04N 1/393; H04N 1/028; H04N 1/10
[52] U.S. Cl. .................................... 358/287; 358/494; 358/471
[58] Field of Search ................ 358/256, 287, 293, 294, 358/285

[56] References Cited
U.S. PATENT DOCUMENTS 4,564,865  1/1986  Yamada .............................. 358/287
4,665,440  5/1987  Tromborg ........................... 358/294
4,691,237  9/1987  Shimizu .............................. 358/293
4,692,812  9/1987  Hirahara et al. ................... 358/293
4,760,466  7/1988  Nakamura ........................... 358/293

OTHER PUBLICATIONS

Ricore 3000 Service Manual, Ricoh Company, Ltd., Tokyo, 1983, pp. 7, 28–29, 55–58.
Richard H. Tuhro, "Image Scaling Using Bit Throwaway Memory"; Xerox Disclosure Journal, vol. 5, No. 6, Nov./Dec. 1980, p. 639.

Primary Examiner—James J. Groody
Assistant Examiner—Randall S. Svihla
Attorney, Agent, or Firm—Oblon, Spivak, McClelland, Maier & Neustadt

[57] ABSTRACT

An image processing method and system in which an original image is read line by line by means of a plurality of image sensors to produce image data segments corresponding to respective segments of a line read by each of the image sensors. The image data segments produced by the image sensors are processed to produce a second plurality of image data segments, which are subsequently subjected to a predetermined image processing operation. The second plurality of image data segments are combined, either before or after being subjected to image processing, into a line of image data for each original image line. The optical processing performed on the second plurality of image segments is typically magnification or minification, and is performed by storing the second plurality of image segments in a memory and controlling the clock and the address of the memory by means of selective magnification data stored in another memory, wherein the magnification data are selected in accordance with the desired magnification or minification.

10 Claims, 36 Drawing Sheets

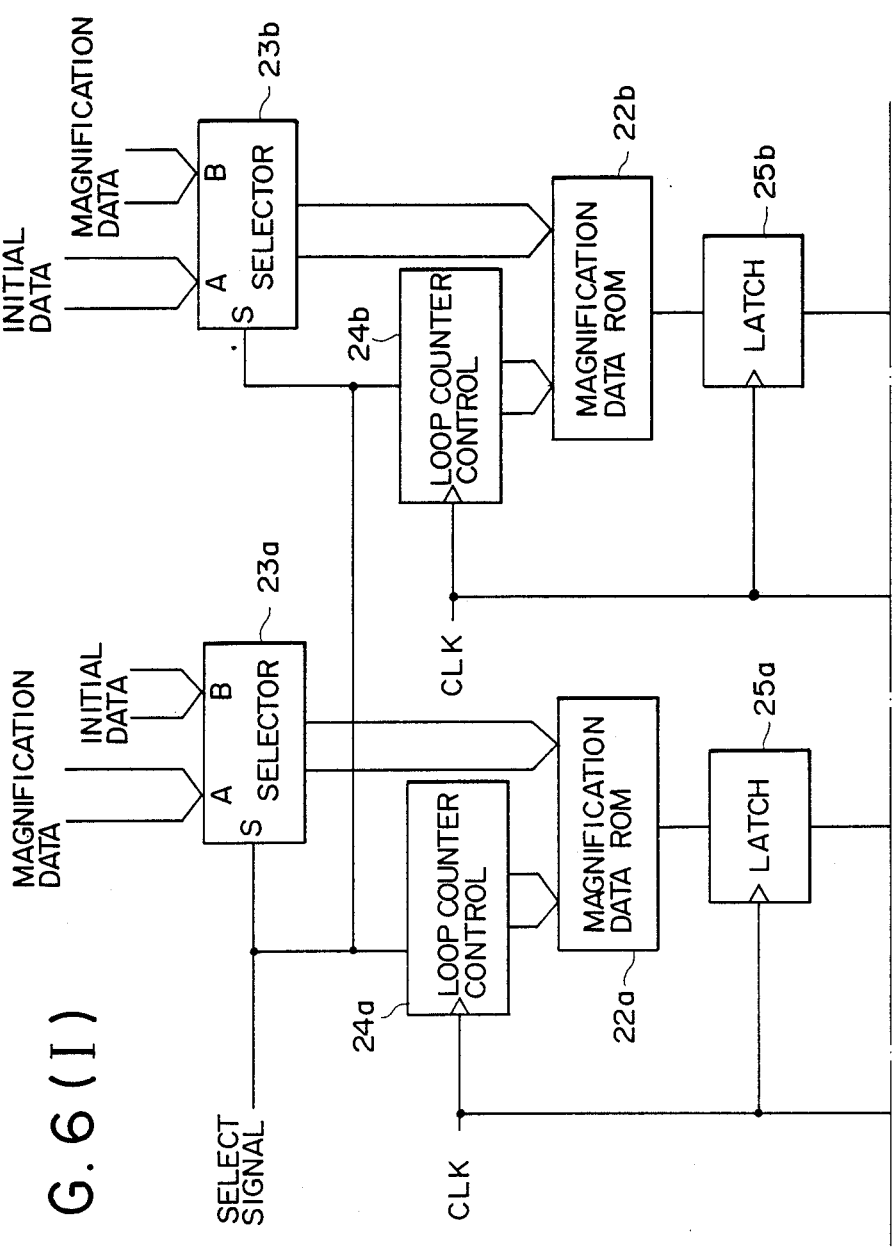
FIG.6(I)
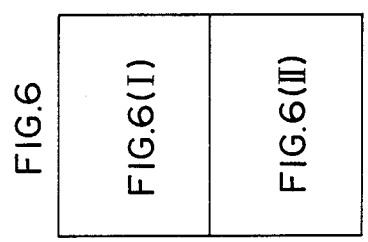

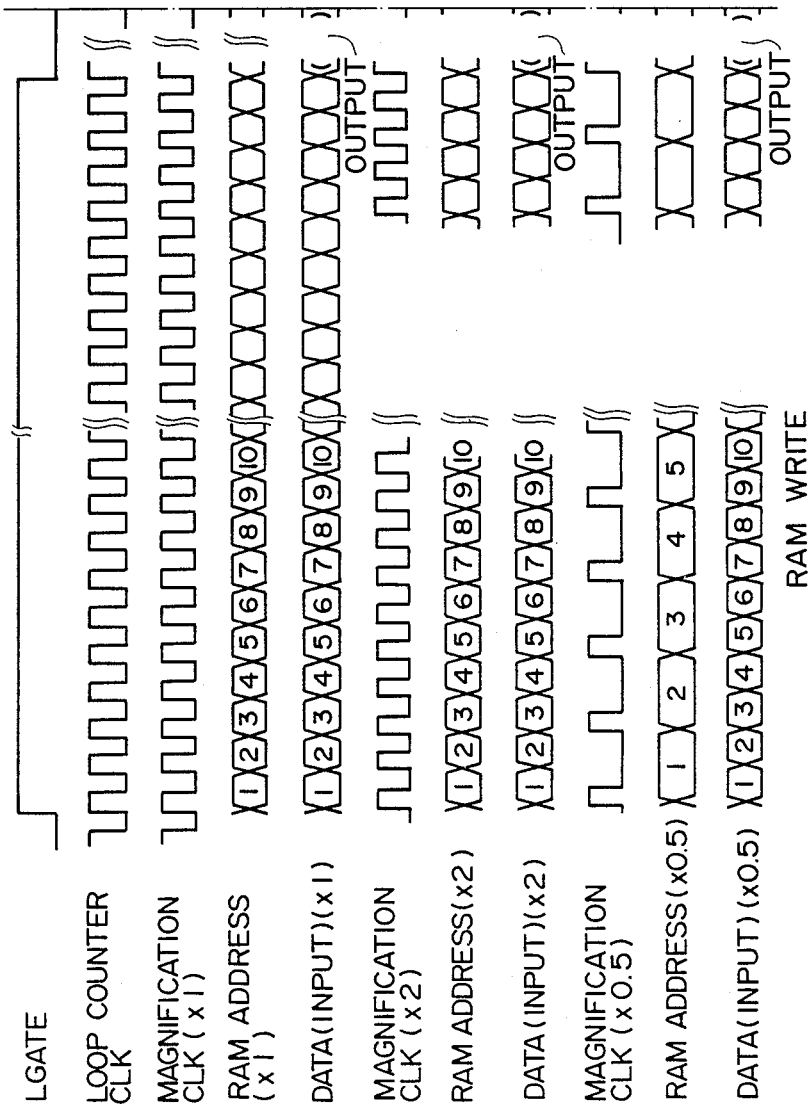

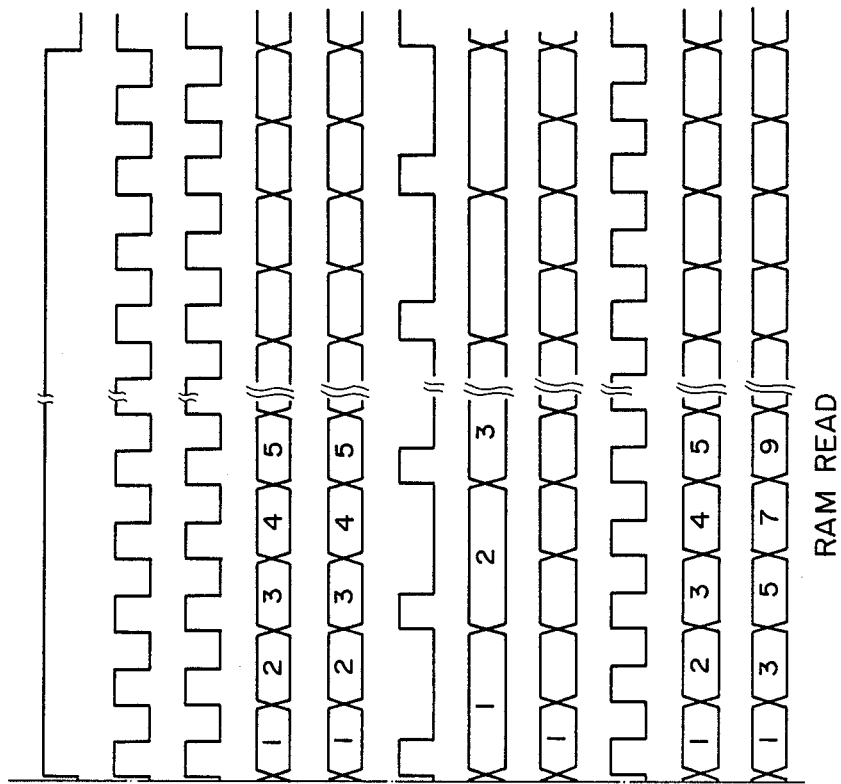

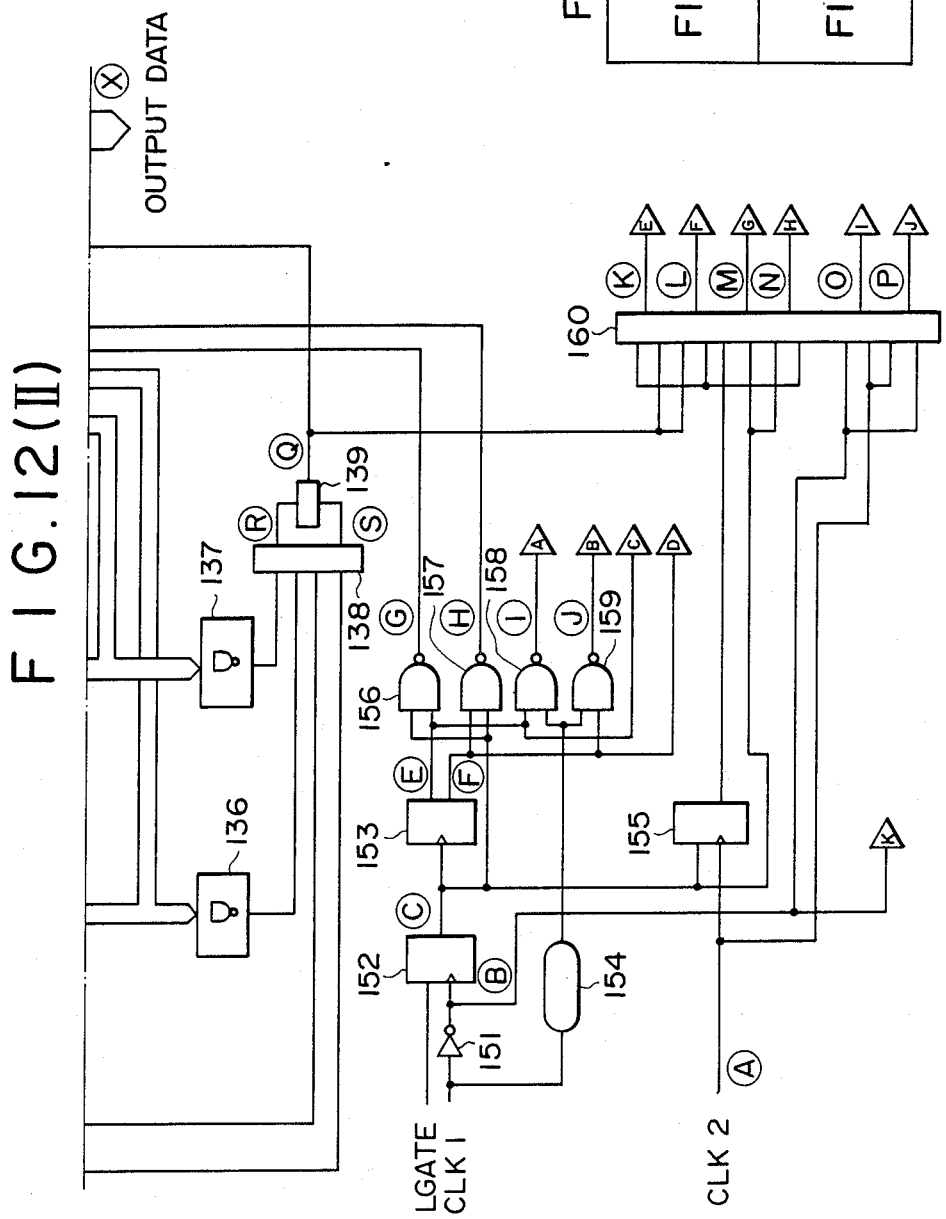

F I G. 13a(I)
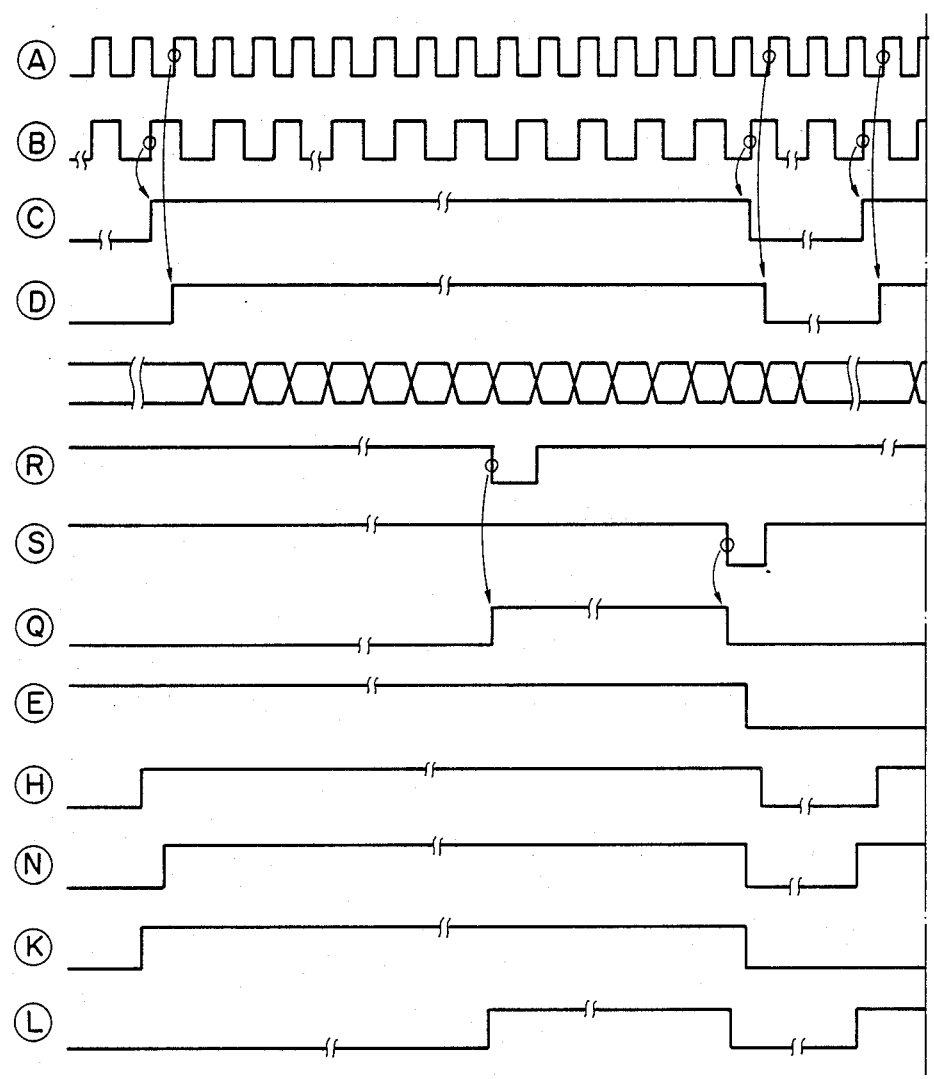

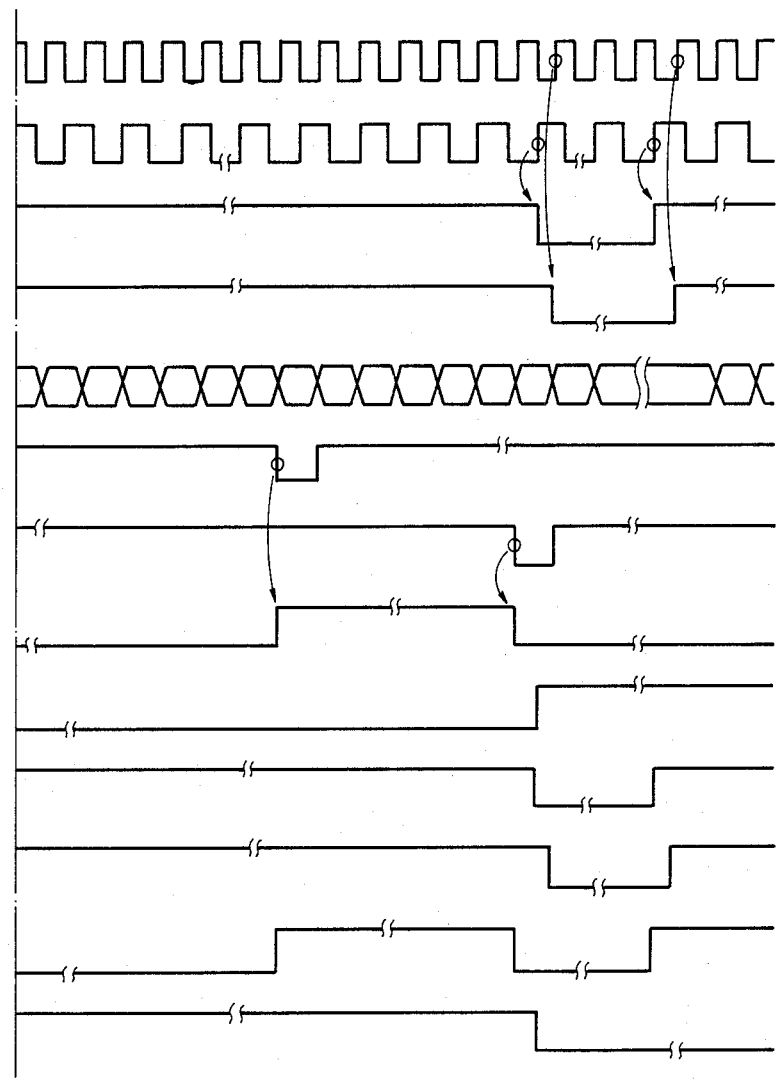
FIG.13a(II)

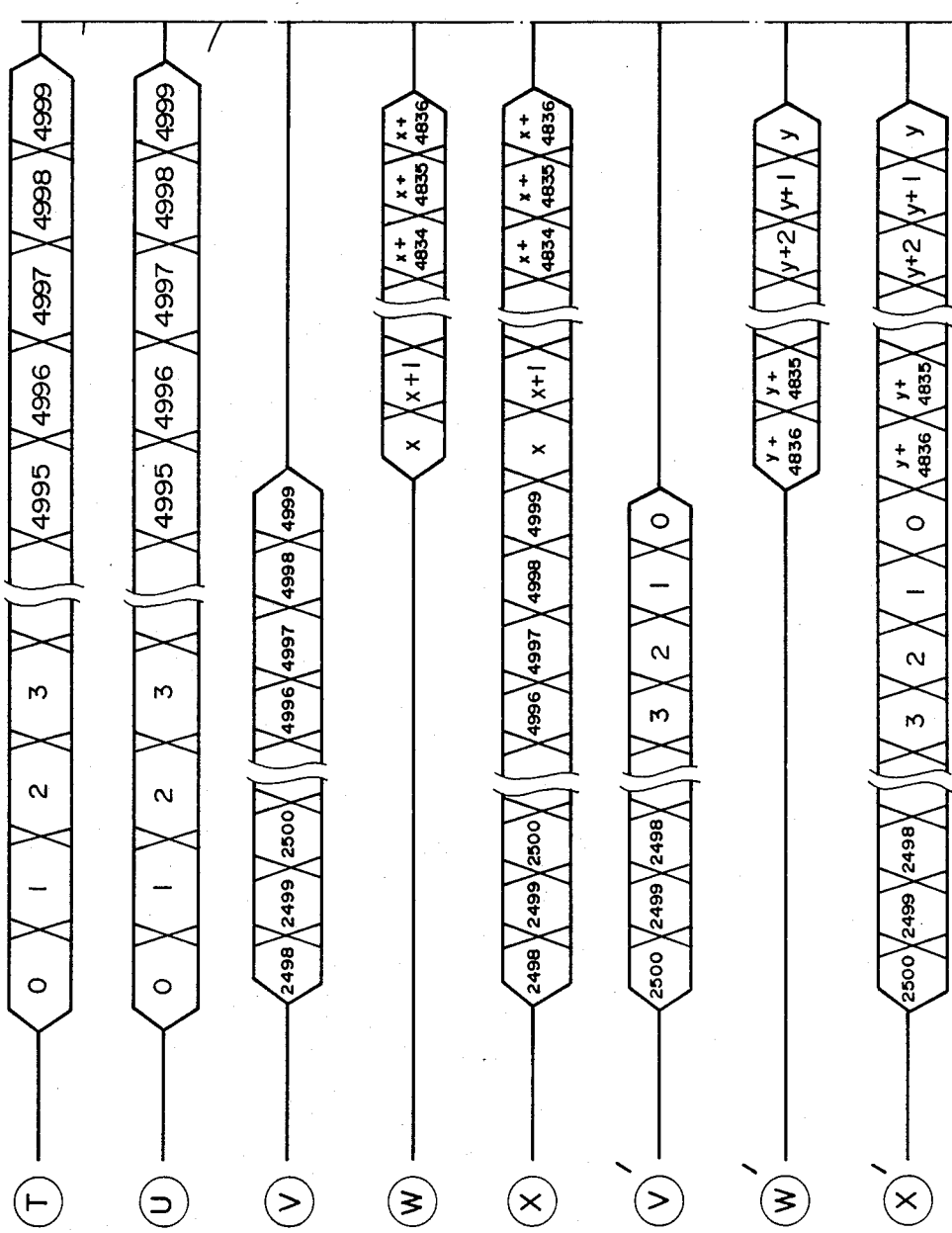

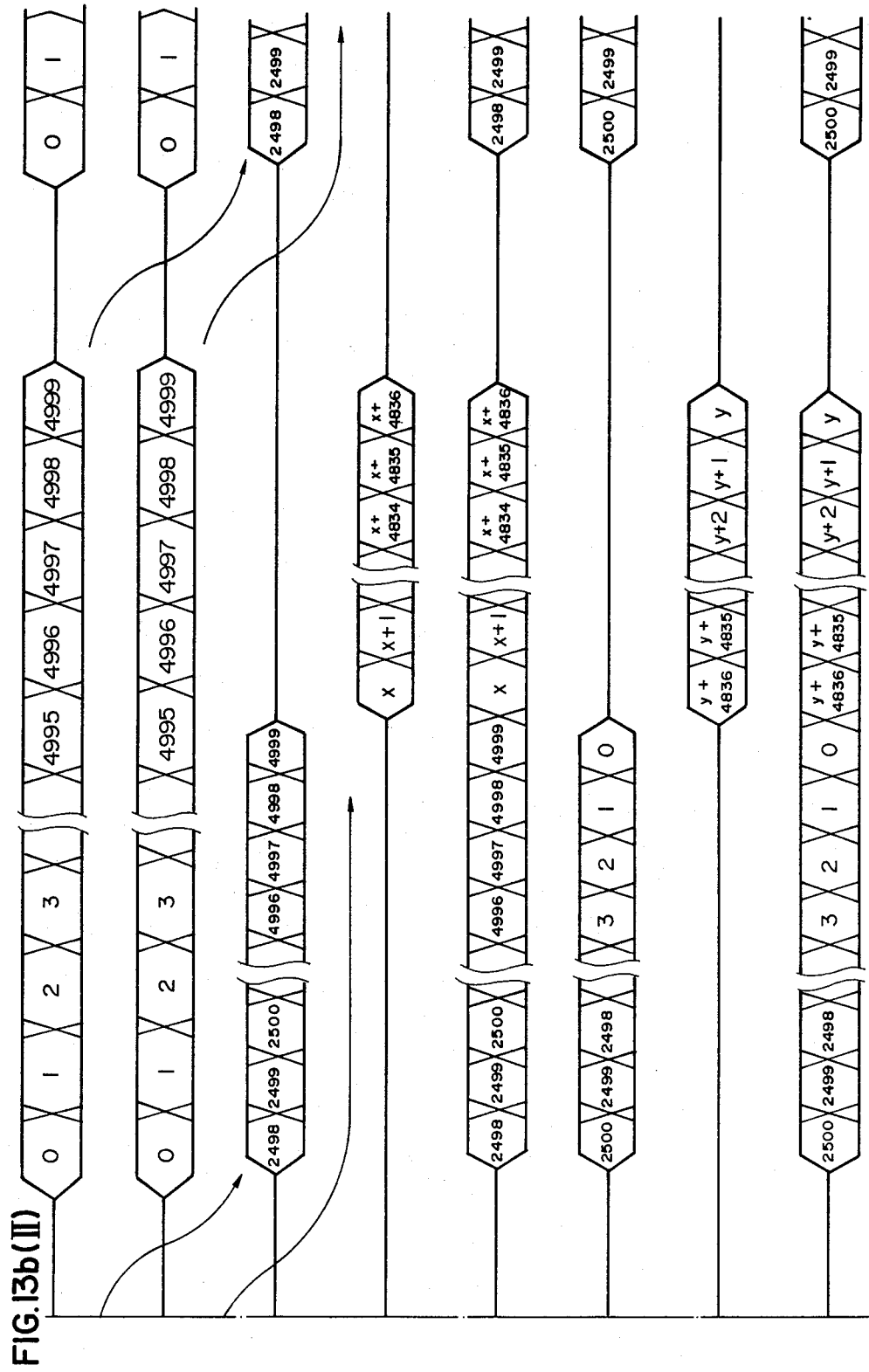
FIG.13b(II)

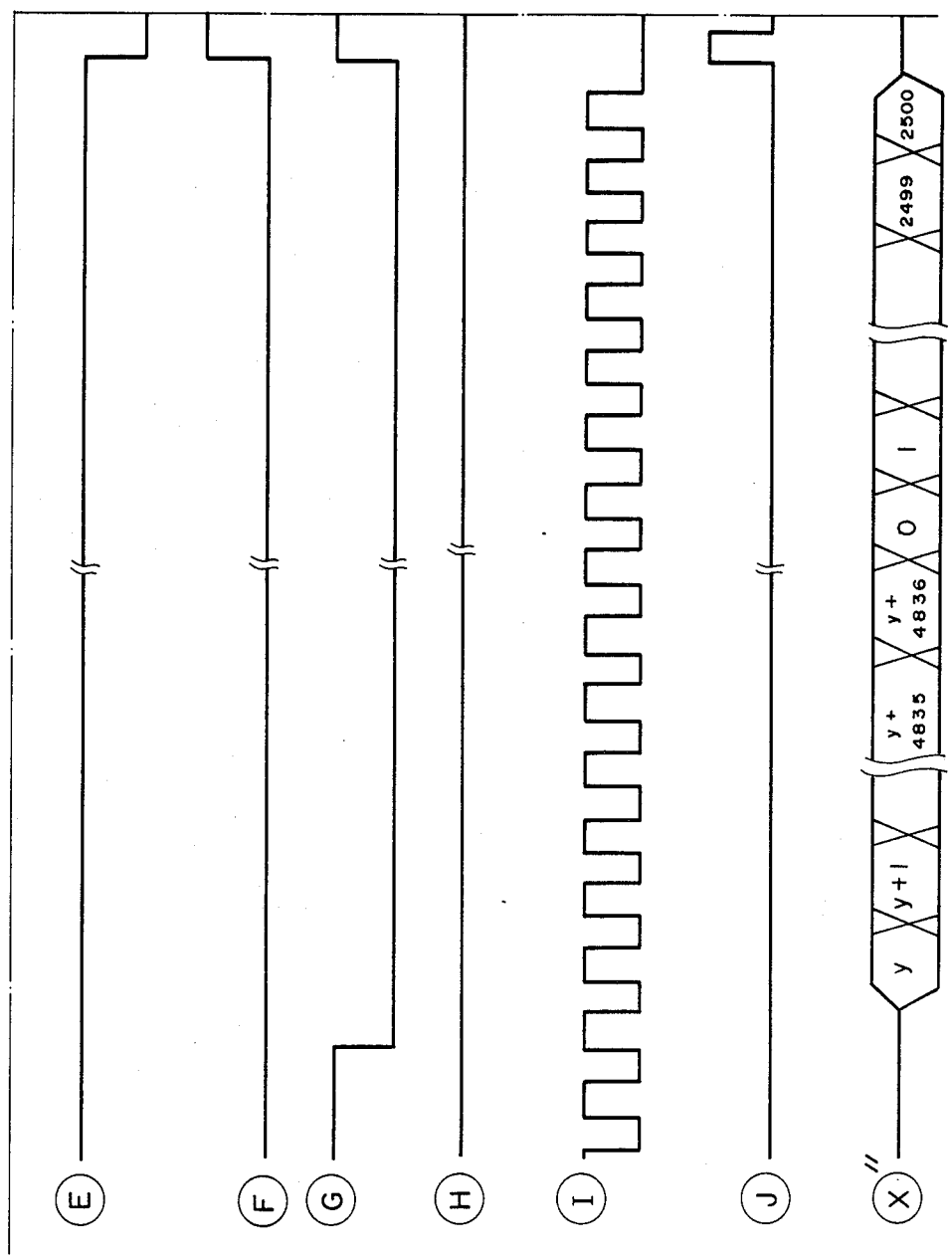
FIG.13b(III)

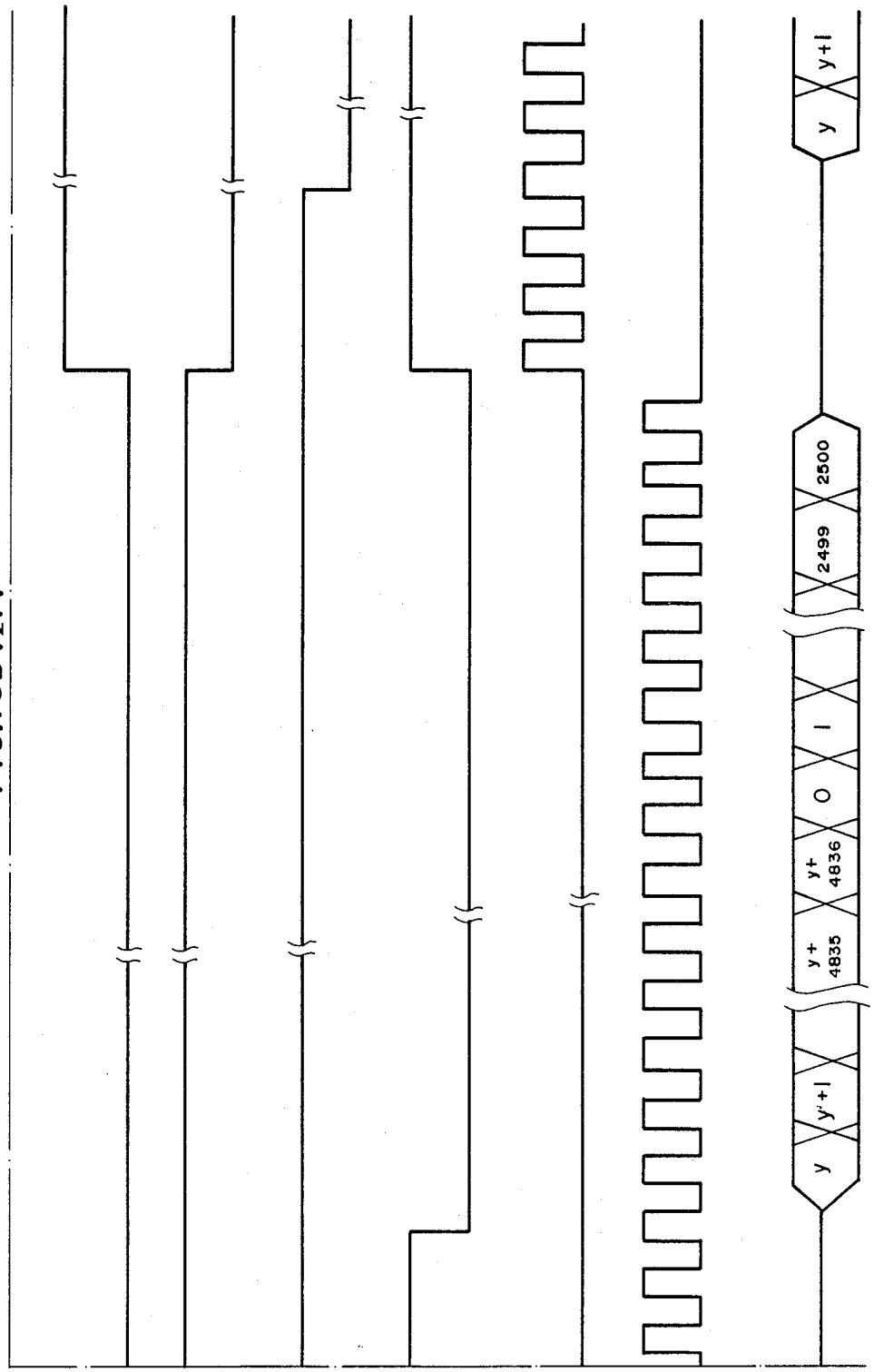
FIG.13b(IV)

FIG.14(III)
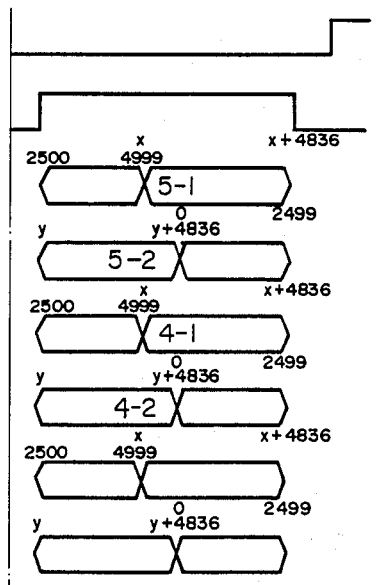
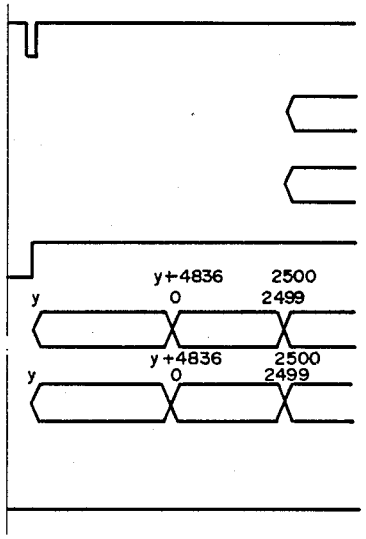
FIG.14
| FIG.14(I) | FIG.14(II) | FIG.14(III) |

F I G. 15(II)
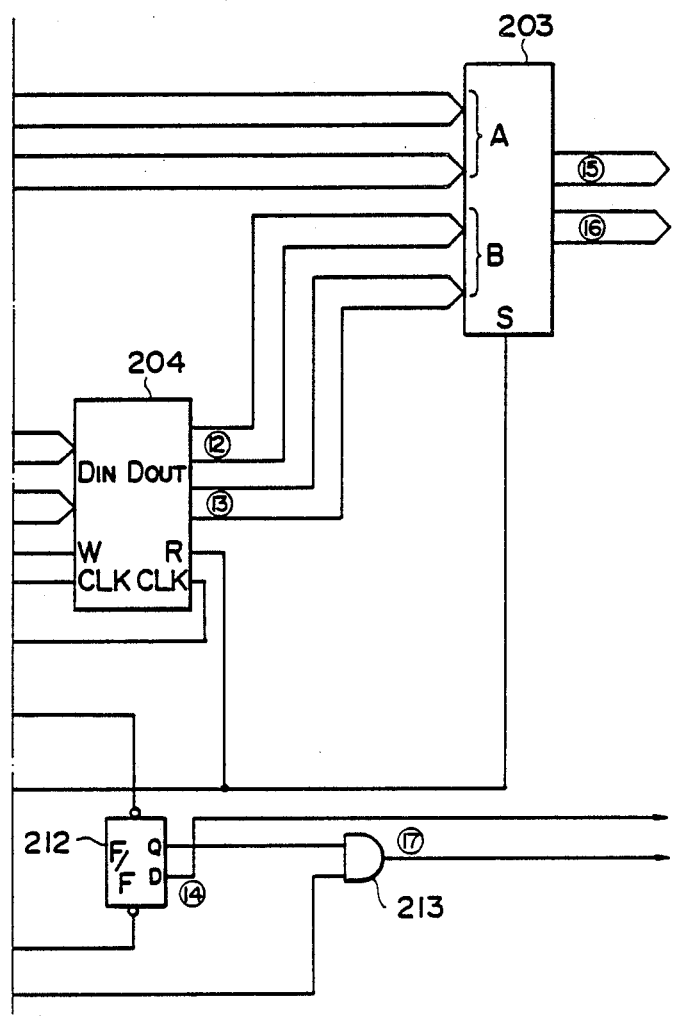

F I G. 16
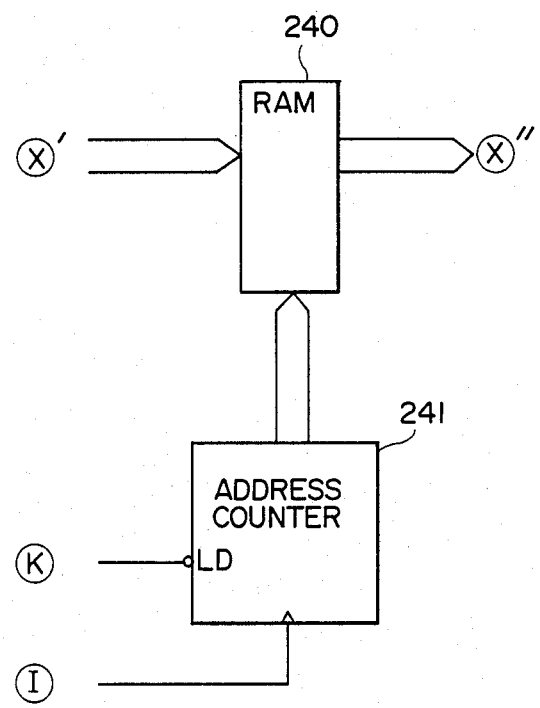

FIG.18(II)
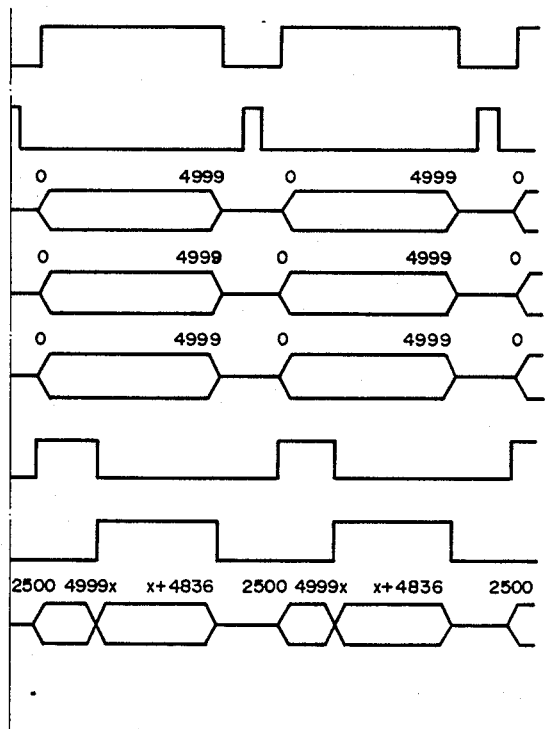
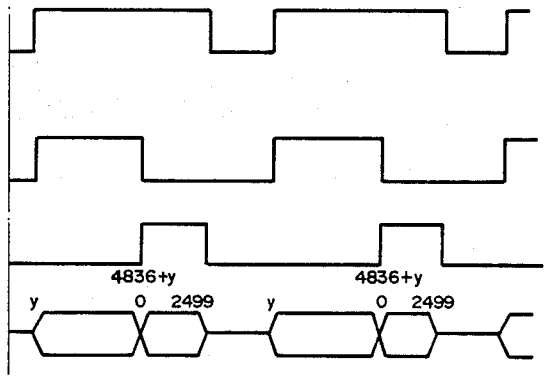
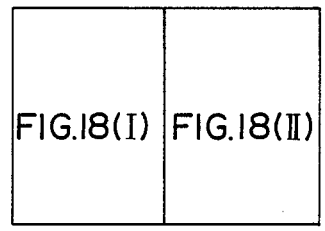
FIG.18
| FIG.18(I) | FIG.18(II) |

FIG.19a(II)
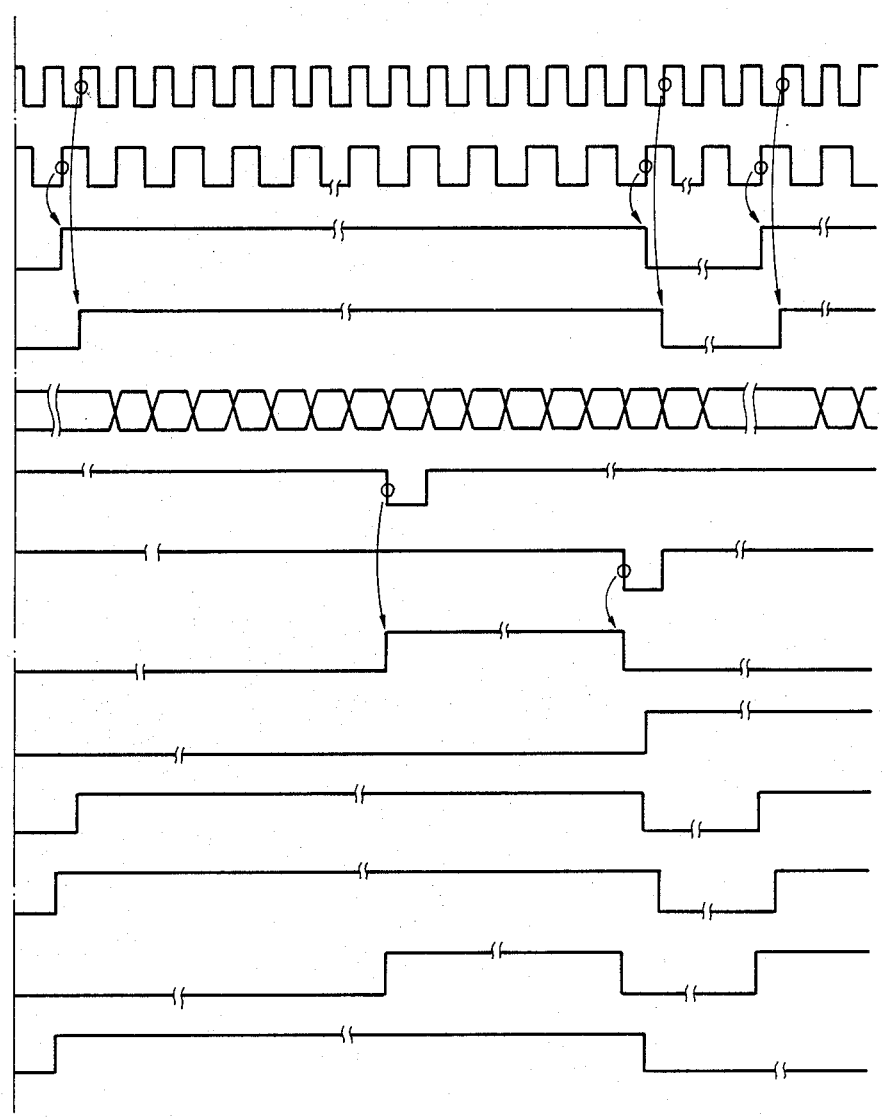

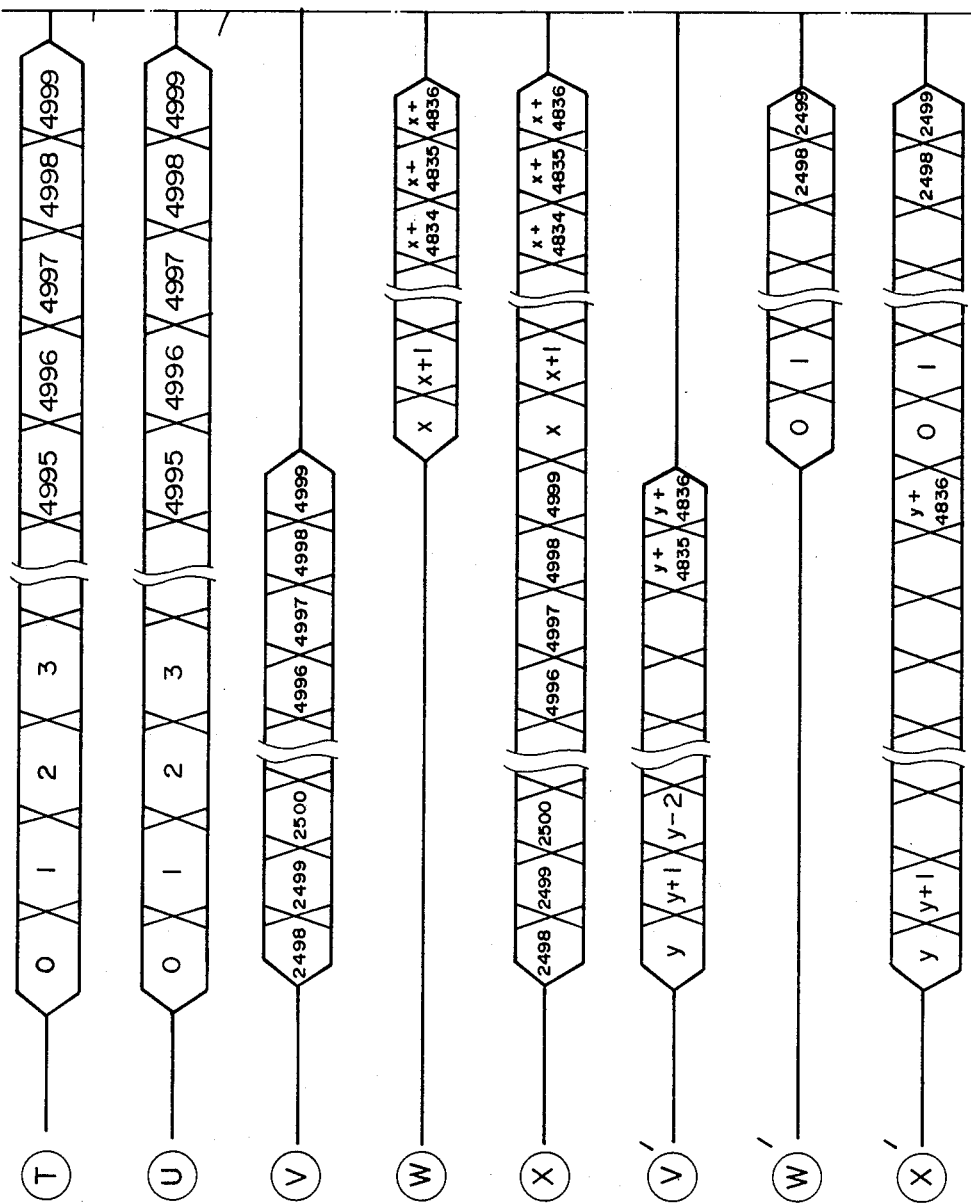

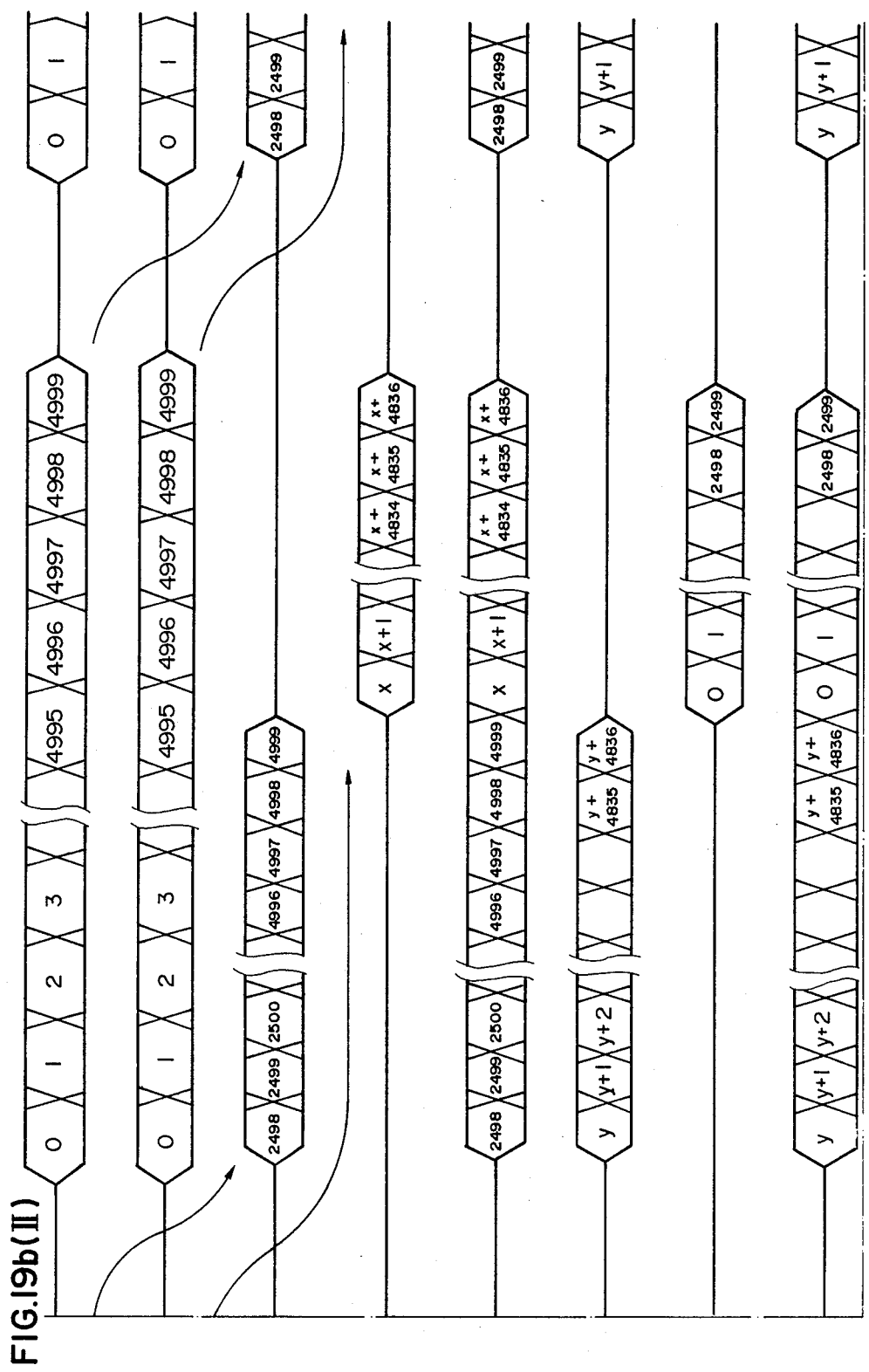
FIG.19b(II)

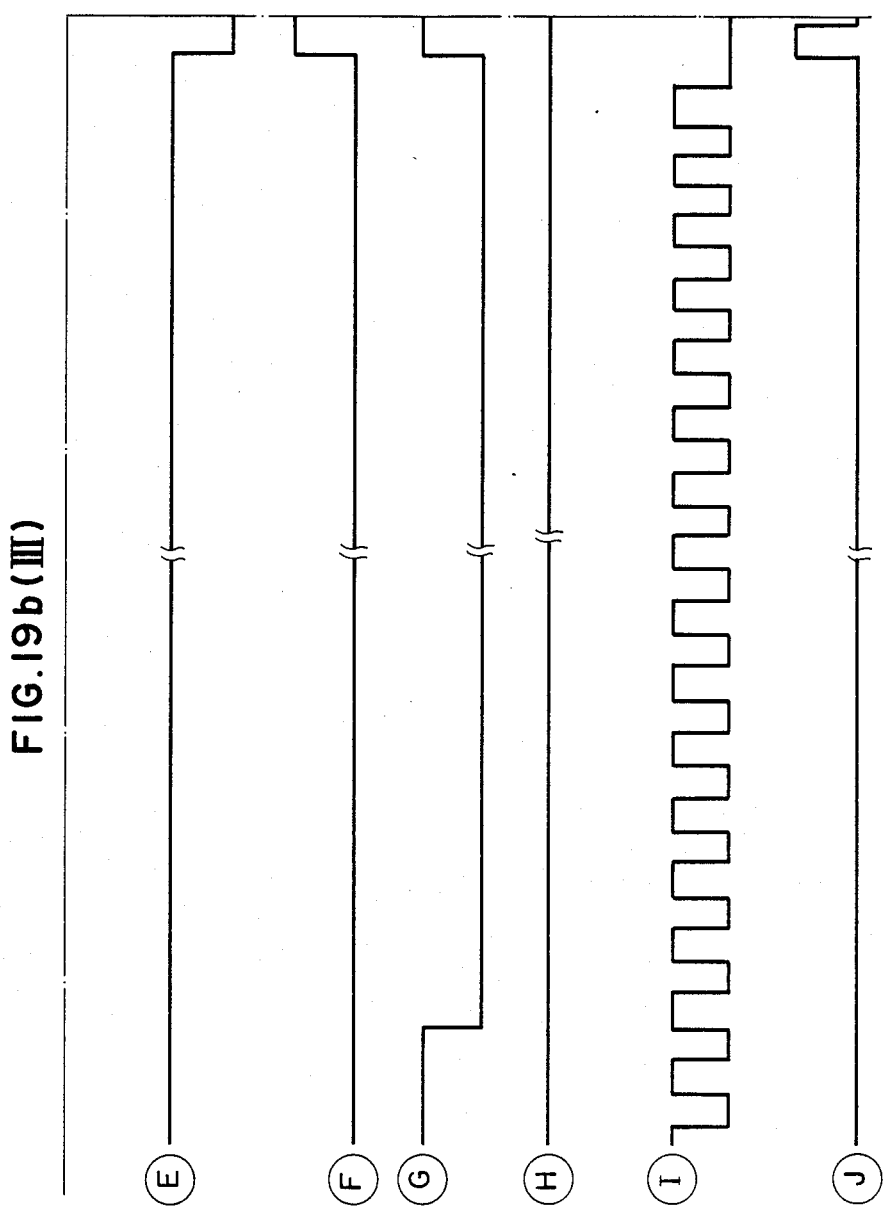

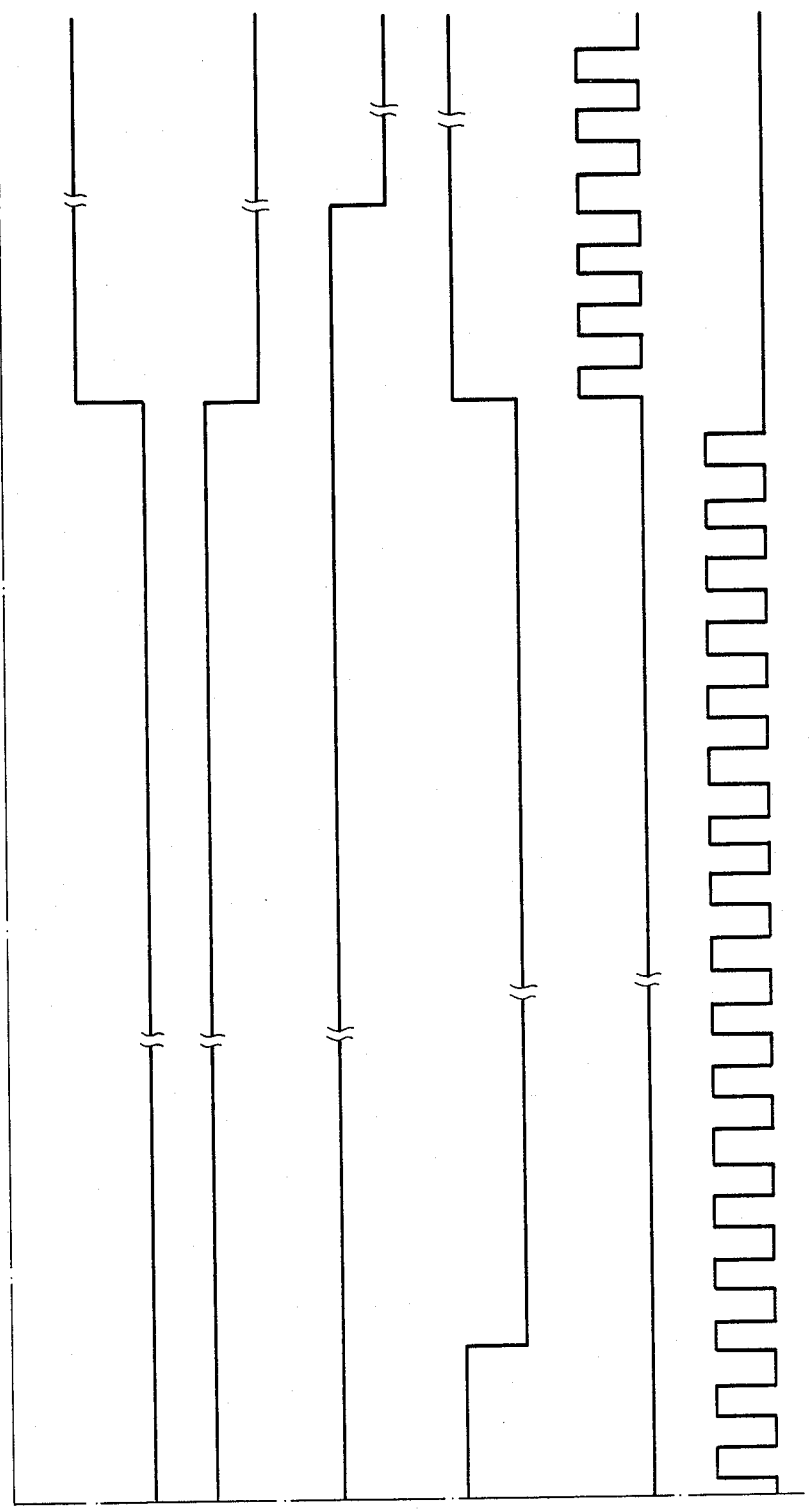
FIG.19b(IV)

F I G. 20

| x 1 | x 2 | x 3 |
|-----|-----|-----|
| x 4 | x 5 | x 6 |
| x 7 | x 8 | x 9 |

IMAGE PROCESSING METHOD AND SYSTEM USING MULTIPLE IMAGE SENSORS PRODUCING IMAGE DATA SEGMENTS WHICH ARE COMBINED AND SUBJECTED TO OPTICAL PROCESSING

BACKGROUND OF THE INVENTION

1. Field of the Invention

This invention generally relates to a digital image signal processing system and method, and, in particular, to an image processing system using multiple image sensors for optically reading an original. More specifically, the present invention relates to an image procsses-ing system suitable for use in digital copiers, facsimiles, CAD apparatuses and filing input devices.

2. Description of the Prior Art

An optical image reading system using multiple image sensors is well known. In such an optical image reading system, multiple image sensors are operated at the same time to read segments of one scanning line simultaneously and the segmented image data are arranged in a line. With such a system, even if an original to be read is relatively large, in particular wide, in size, the original can be read at a high speed. However, since the segmented image data are integrated into one line within one scanning period, the integrated data must be processed at an increased speed. Thus, as the number of image sensors increase so as to accommodate a larger-sized original, the required processing speed for processing an integrated image data becomes higher. As a result, a high speed processor is required which pushes up a cost. It is a true that the image data for one line may be divided into two lines, i.e., even-numbered image data and odd-numbered image data, and these divided data may be processed in parallel at a reduced image processing rate. However, in this case, the image data obtained by a plurality of image sensors must be once integrated into a single line and then the image must be divided into a plurality of lines, so that the process tends to be complicated.

SUMMARY OF THE INVENTION

In accordance with one aspect of the present invention, there is provided an image processing system and method using a first plurality of images sensors, each disposed to read a predetermined segment of a scanning line, in which image data read by the first plurality of image sensors are arranged into a second plurality, which is different, typically smaller in number, from the first plurality, of line segments of image data. The first plural line segments of image data have a first data rate and the second plural line segments of image data have second data rate, which is different from and typically higher than the first data rate. The second plural line segments of image data are then subjected to a desired processing, such as change of magnification, and, then, the second plural line segments of the thus processed image data may be integrated into a single line of image data. Preferably, the second plurality of line segments include left-half and right-half segments of a scanning line. Thus, in the preferred embodiment, the first plural line segments of image data is arranged into two line segments of image data prior to a required processing. In this case, an original to be read is placed with its center as a reference position, so that the left half line segment corresponds to the left half of the original and the right-half line segment corresponds to the right-half of the original. With this structure, a desired image processing, such as size change, i.e., change of magnification, can be carried out at high speed in parallel processing while maintaining a high image quality.

In the preferred embodiment, in order to convert the first plural line segments of image data into the second plural line segments of image data, the first plural line segments of image data are stored into memory means at the first data rate and the image data thus stored is then read out at the second data rate to thereby convert the first plural line segments of image data into the second plural line segments of image data. The second line segments of image data may then be subjected to a desired processing, such as change of rate of magnification, and, in this case, magnification data stored in a magnification ROM can be input as a clock signal into an image memory in which the image data is temporarily stored. With this structure, the image data may be enlarged or reduced in size depending on the nature of the magnification data used while keeping the image data divided in the second plural lines.

In accordance with another aspect of the present invention, the second plural line segments of image data for a first scan line and the second plural line segments of image data for a second scan line are arranged into first and second scan lines of image data in parallel without change of data rate. And, a desired processing, such as change of magnification, is applied to the parallel first and second lines of image data.

It is therefore a primary object of the present invention to obviate the disadvantages of the prior art as described above and to provide an improved image processing system.

Another object of the present invention is to provide an improved image processing system using a plurality of image sensors for optically reading an original.

A further object of the present invention is to provide an improved optical reading system suitable for use in an image processing apparatus, such as a digital copier, a facsimile, a CAD system and a filing input apparatus.

A still further object of the present invention is to provide an improved image processing system using multiple image sensors, which is fast in operation and simple in structure and thus low at cost.

A still further object of the present invention is to provide an improved image processing system using multiple image sensors, which allows to apply any desired processing to image data at high speed and high image quality.

Other objects, advantages and novel features of the present invention will become apparent from the following detailed description of the invention when considered in conjunction with the accompanying drawings.

BRIEF DESCRIPTION OF THE DRAWINGS

FIGS. 6, 6(I), and 6(II) are a block diagram showing a magnification variation processing unit provided in the structure shown in FIG. 4;

FIGS. 7, 7(I), and 7(II) are a timing chart which is useful for understanding the operation of the structure shown in FIG. 6;

FIGS. 12, 12(I), and 12(II) are a schematic illustration showing partly in blocks and partly in logic symbols the detailed structure of a combination/separation up and down circuits suitable for use in the system shown in FIG. 3;

FIGS. 18, 18(I), and 18(II) are a timing chart which is useful for understanding the operation of the structure shown in FIG. 17;

FIG. 20 is an illustration showing a matrix of a digital filter.

DESCRIPTION OF THE PREFERRED EMBODIMENTS

Referring now to FIG>1, there is schematically shown an optical image reading system constructed in accordance with one embodiment of the present invention. As shown, the illustrated optical image reading system includes a plurality of transportation rollers 1 through 4, an illumination device 5, an optical lens 6 and an image sensor 7, such as a CCD. With this structure, an original to be optically read is transported by the transportation rollers 1 through 4 in the direction indicated by the arrow. During transportation, the original is illuminated by the illuminating device 5 and thus the original image is focused onto the CCD 7 through the optical lens 6. In this case, since the effective number of pixels readable per CCD 7 is fixed, the maximum reading width is determined when the original reading density or resolution is determined. Thus, if an original to be read is larger than this maximum reading width, use must be made of two or more CCDs.

Figure 1:
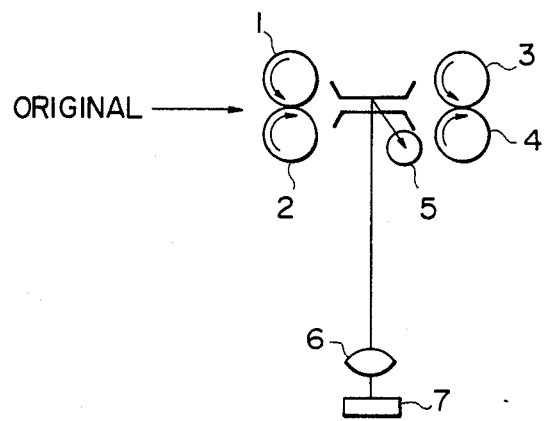
FIG. 1 is a schematic illustration showing an optical image reading system constructed in accordance with one embodiment of the present invention.
Figure 2:
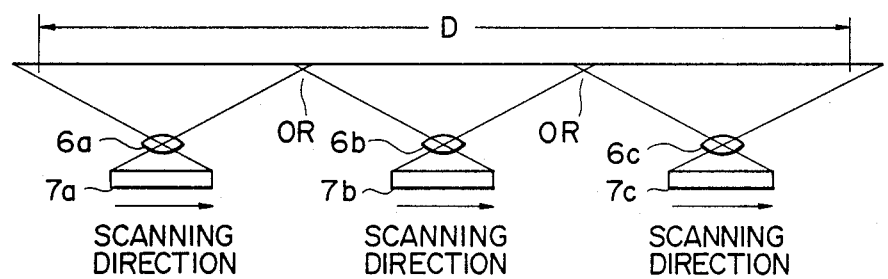
FIG. 2 is a schematic illustration showing a relationship between a maximum original width D and a plurality of image sensors disposed in the widthwise direction.

In one embodiment, it is assumed that the effective number of pixels readable per CCD 7 is 5,000 and the maximum width of an original to be read is 917 mm with the original reading density or resolution is 16 pixels/mm. Under the circumstances, since the maximum width of an original is 917 mm and the reading resolution is 16 pixels/mm, the maximum effective number of readable pixels 14,672. Since the effective number of readable pixels per CCD 7 is 5,000, there must be provided three such CCDs so as to cover the maximum width of an original. FIG. 2 illustrates the case in which three such CCDs are provided as arranged in a line. In FIG. 2, D indicates the maximum width of an original while 6a through 6c indicating optical lenses, each provided for an associated CCD, 7a through 7c indicating CCDs and OR indicating an read overlapping region between two adjacent CCDs. In the case of FIG. 2, use is made of three image sensors or CCDs 7a through 7c in order to read an original having the maximum width D, and a corresponding segment of the original image is focused onto the corresponding one of the image sensors 7a through 7c by means of an associated optical lens 6a, 6b or 6c. It is to be noted that the read overlapping region OR is defined between two adjacent segments of the original image. This read overlapping region OR is adjusted such that it has the number of pixels equal to or less than $(15,000-14,672)/2=164$ so as to be able to read the maximum original width D. Segments of an original image data in a scan line formed on the respective CCDs 7a through 7c are output as analog data from the respective CCDs 7a through 7c; however, such analog data are extremely small in amplitude, they must be amplified.

Figure 3:
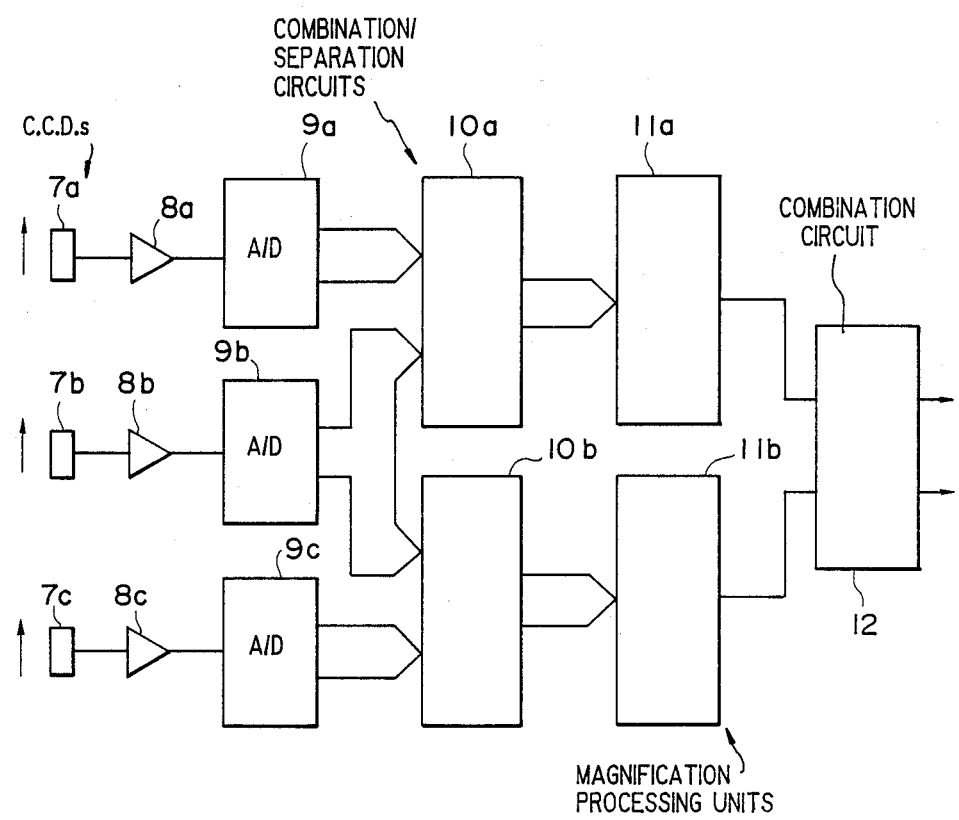
FIG. 3 is a block diagram showing the overall structure of an image processing system using multiple image sensors constructed in accordance with one embodiment of the present invention.

FIG. 3 illustrates in block form an image processing system for processing image data optically read by three CCDs constructed in accordance with one embodiment of the present invention. As shown, the illustrated system includes three CCDs 7a through 7c, three amplifiers 8a through 8c, three A/D converters 9a through 9c, and a pair of combination/separation circuits 10a and 10b. In operation, analog image outputs from the CCDs 7a through 7c are amplified by the amplifiers 8a through 8c, and, then, the thus amplified outputs are converted into digital image signals in multiple levels (e.g., 64 levels) for each pixel by the A/D converters 9a through 9c. After A/D conversion, the resulting digital image signal includes noise, due, for example, to illumination irregularities, stain of a contact glass on which an original to be read is transported and irregularities in the sensitivity of each of the CCDs, as superimposed on normal image data. For this reason, in order to rectify this noise problem, the so-called shading correction is typically carried out in the A/D converter. In this manner, an analog image output from each of the CCDs is amplified, subjected to shading correction and converted into multi-level digital image data, which is then input into the pair of combination/separation circuits 10a and 10b.

Figure 4:
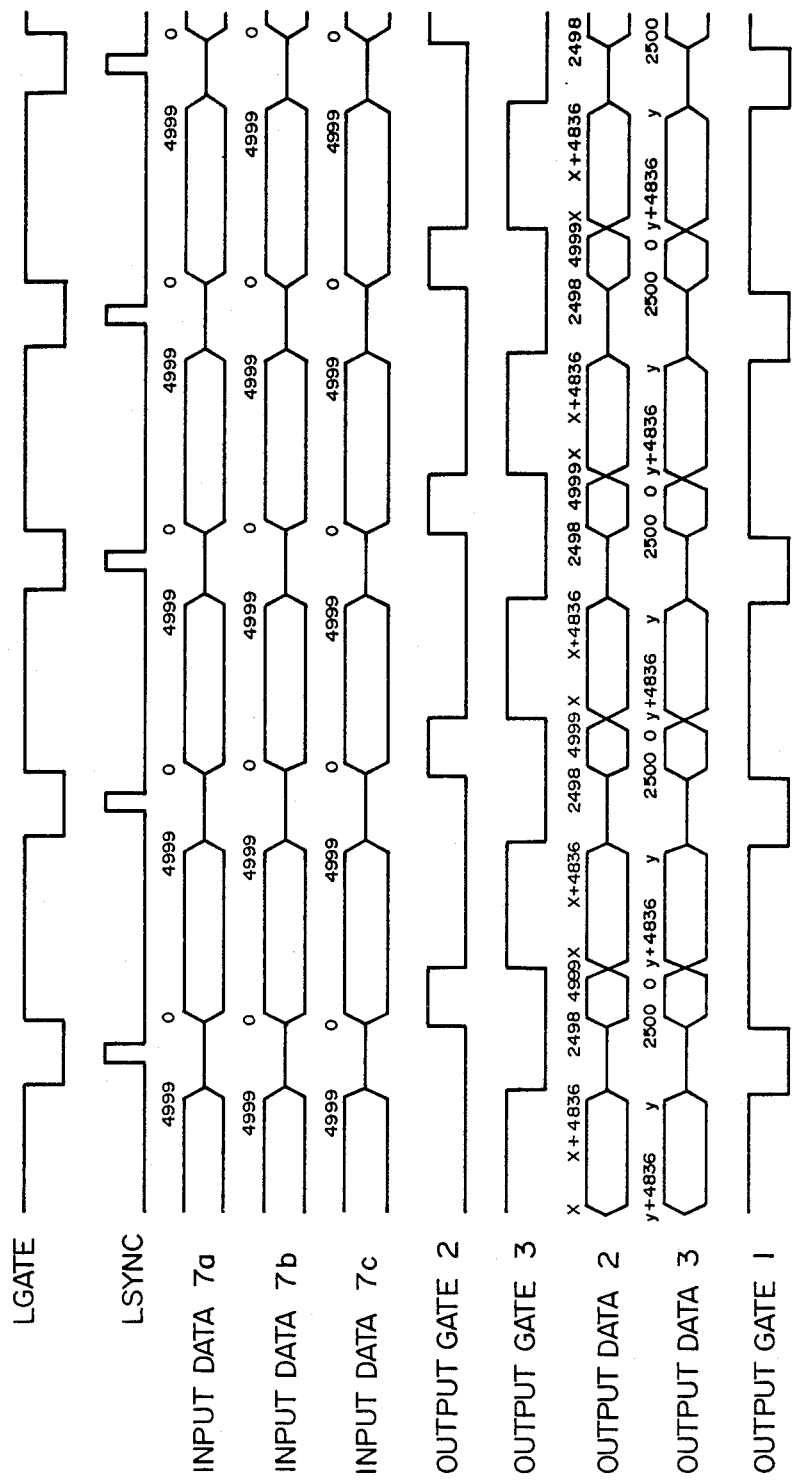
FIG. 4 is a timing chart which is useful for understanding the operation of the structure shown in FIG. 3.

In the above-described structure, it is to be noted that all of the CCDs are operated at the same time so that respective segments of a single scan line are read at the same time in parallel. And, thus, all of the CCDs sequentially output analog image data of the respective segments thus read at the same time. That is, as shown in FIG. 4, all of the CCDs 7a through 7c are synchronized in the optical or main scanning direction by a scanning sync signal LSYNC and valid data from the CCDs 7a through 7c are controlled by a control signal LGATE. It is assumed here that LSYNC is output 16 times per 1 mm in the auxiliary scanning direction, i.e., direction in which the original to be read is transported. And, thus, the resolution in the auxiliary scanning direction is also set at 16 pixels/mm, which is in agreement with the resolution of 16 pixels/mm in the main scanning direction. It is to be noted that the scanning sync signal LSYNC is output at a predetermined interval so as to maintain the charge storage time period of CCD at constant.

In the above-described structure, there are obtained three line segments of image data by the three CCDs 7a through 7c in parallel during a predetermined time period, or scan period, between two adjacent scanning sync signals LSYNC. As described previously, various processing operations, such as correction of read overlapping region between two adjacent CCDs, and various digital processing operations, such as change of magnification of image data, MTF processing and smoothing processing, which are carried out after the analog processing operations must also be carried out during such as scan period. As a result, typically, the segmented image data output from the three CCDs are arranged into a single line of image data, to which correction of the read overlapping region is applied. However, when the image data output from three CCDs are arranged into one line of image data within a scan period, the processing speed per pxiel of such one line of image data becomes tripled, which thus requires a high speed image processing system.

In the present embodiment, if 5,000 pixels are processed per CCD within a scan period of 312.5 micro seconds, the processing time per pixel is 62.5 ns/pixel. And, if the segmented image data from the three CCDs are combined into one line of image data within the scan period of 312.5 micro seconds, the processing time per pixel becomes 20.8 ns/pixel, which is three times higher than the original processing time. Under the condition, in accordance with the principle of one aspect of the present invention, the maximum original width D is divided into left-half and right-half segments from a center point, which corresponds in the present example to a center pixel which is the 2,449th pixel of the CCD 7b in FIG. 2. In this case, an original is supposed to be placed with its center as a reference. With this structure, the maximum of 7,500 pixel data for each left-half or right-half are processed during the scan period. Preferably, one of the left or right half is canned in one direction from the center and the other is scanned in the opposite direction from the center at the same time. Thus, the image data of the left and right half segments of one line may be processed at the time time in parallel, so that the processing speed is prevented from becoming too high. Therefore, in accordance with the embodiment shown in FIG. 3, an original image is read with the image data of one line divided into three line segments by the three CCDs 7a through 7c, these three line segments of image data read by the three CCDs 7a through 7c are rearranged into two line segments of image data.

Figure 5A:
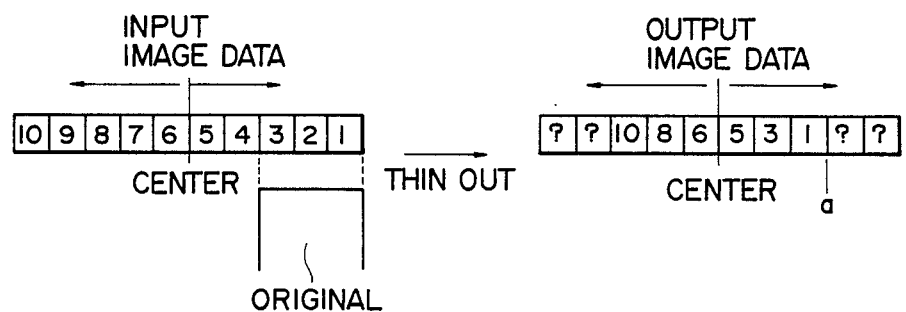
FIGS. 5a, 5b, and 5c are illustrations which are useful for explaining division of image data of one scan line into segments.
Figure 5B:
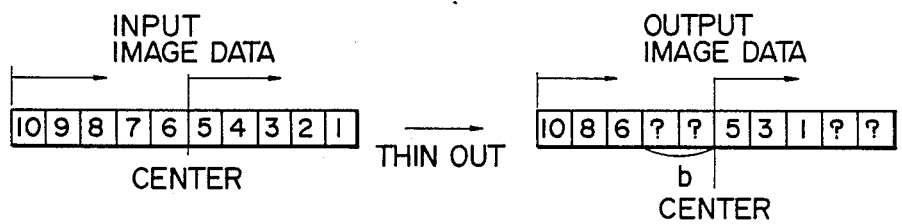
Figure 5C:
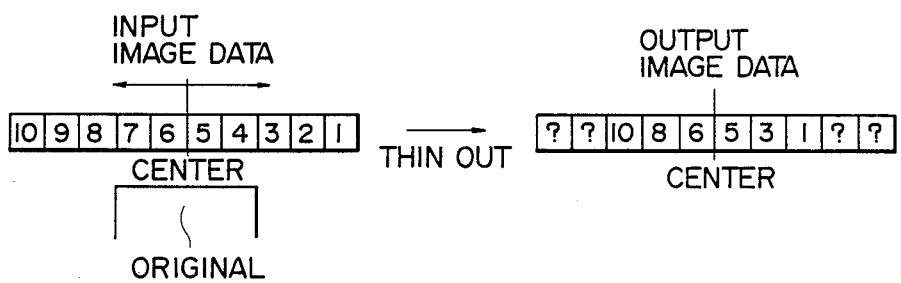

Besides, when the processing direction for one of the left-half or right-half segment of one line is set in one direction (e.g., combination/separation circuit 10a of FIG. 3) and the processing direction of the other segment is set in the opposite direction (e.g., combination/separation circuit 10b of FIG. 3), the connecting portion at the division between the two segments does not prevent any problem for subsequent processing. Described more detail in this respect, if such processing a thinning out of pixels is to be carried out in the subsequent processing, (1) if an original is divided into two from its center using its one side edge as a reference and one half is scanned is one direction with the other scanned in the opposite direction, the location indicated by a must be calculated so as to determine where the reference surface of the original is located. On the other hand, (2) if an original image is divided from its center and both of the divided image segments are scanned in the same direction as shown in FIG. 5b, there will be created a mismatching section indicated by b. On the other hand, in accordance with the present invention, as shown in FIG. 5c, if an original image is divided from its center and one of the divided image segments is scanned in one direction with the other image segment scanned in the opposite direction, the reference of the original image is at its center and the divided image data segments can be connected without problem.

As can be understood from the above, in accordance with the principle of this aspect of the present invention, input image data of one line is divided into two line segments using the center of one line and the segmented image data are scanned at the same time in opposite directions. Thus, the image data can be processed at high speed and without presenting any problem, such as unnatural or strange connection of the segmented image data when combined.

Referring to FIG. 4, as described previously, during a scan period of scanning sync signal LSYNC, image data obtained by the three CCDs 7a through 7c are processed in parallel and a valid region of data is determined by a scanning control signal LGATE. These segmented image data 7b and 7c are input into the two-division processing combination/separation up circuit 10a and the segmented image data 7b and 7a are input into the two-division processing combination/separation down circuit 10b. An output data 2 output from the combination/separation circuit 10a includes 2,498th to 4,999th pixels for the input data 7b and xth to (x+4,836)th pixels for the input data 7c. And, the output timing is controlled by output gates 2 and 3. On the other hand, an output data 3 output from the combination/separation down circuit 10b includes 2,500th to 0th pixels for the input data 7b and (y+4,836)th to yth pixels for the input data 7a, and the output timing is similarly controlled by output gates 2 and 3.

It is to be noted that the output data from the combination/separation up circuit 10a is output in one direction of the main scanning direction at a speed which is 1.5 times faster than the data input speed. On the other hand, the combination/separation down circuit 10b outputs image data in the opposite direction of the main scanning direction at a speed which is 1.5 times faster than the data input speed. It should also be noted that the values of x and y indicate respective overlapping amounts between the center CCD 7b and the left and right CCDs 7a and 7c while the number of valid pixels for the center CCD 7b is set at 5,000. As set forth before, the value of each of x and y must be set to be equal to or less than 164. Furthermore, the reason why the central division data of the center CCD 7b are overlapping is because these are the data required for the next stage of image processing unit.

In addition, the image data output from the combination/separation circuits 10a and 10b are input into respective magnification processing circuits 11a and 11b. As described above, in the present embodiment, the valid data length at the image output unit is 612 mm and the data is output at pixel density of 16 lines/mm, so that 9,792 pixels are required. As described before, the output data from the three CCDs 7a through 7c are output at the same time during a LSYNC scan period and these three strings of output data are converted into two strings of data by the combination/separation circuits 10a and 10b. Thus, the data of 7,500 pixels is processed in a time period of 312.5 micro seconds, which corresponds to the image frequency of 24 MHz. In this case, since the converted two strings of image data (9.792/2=4,896 pixels) must be output to an image output unit (not shown) within 312.5 micro seconds, the image frequency to the image output unit is approximately at 16 MHz. The magnification processing units 11a and 11b shown in FIG. 3 also take care of this image frequency conversion between input image data and output image data.

Figure 6:
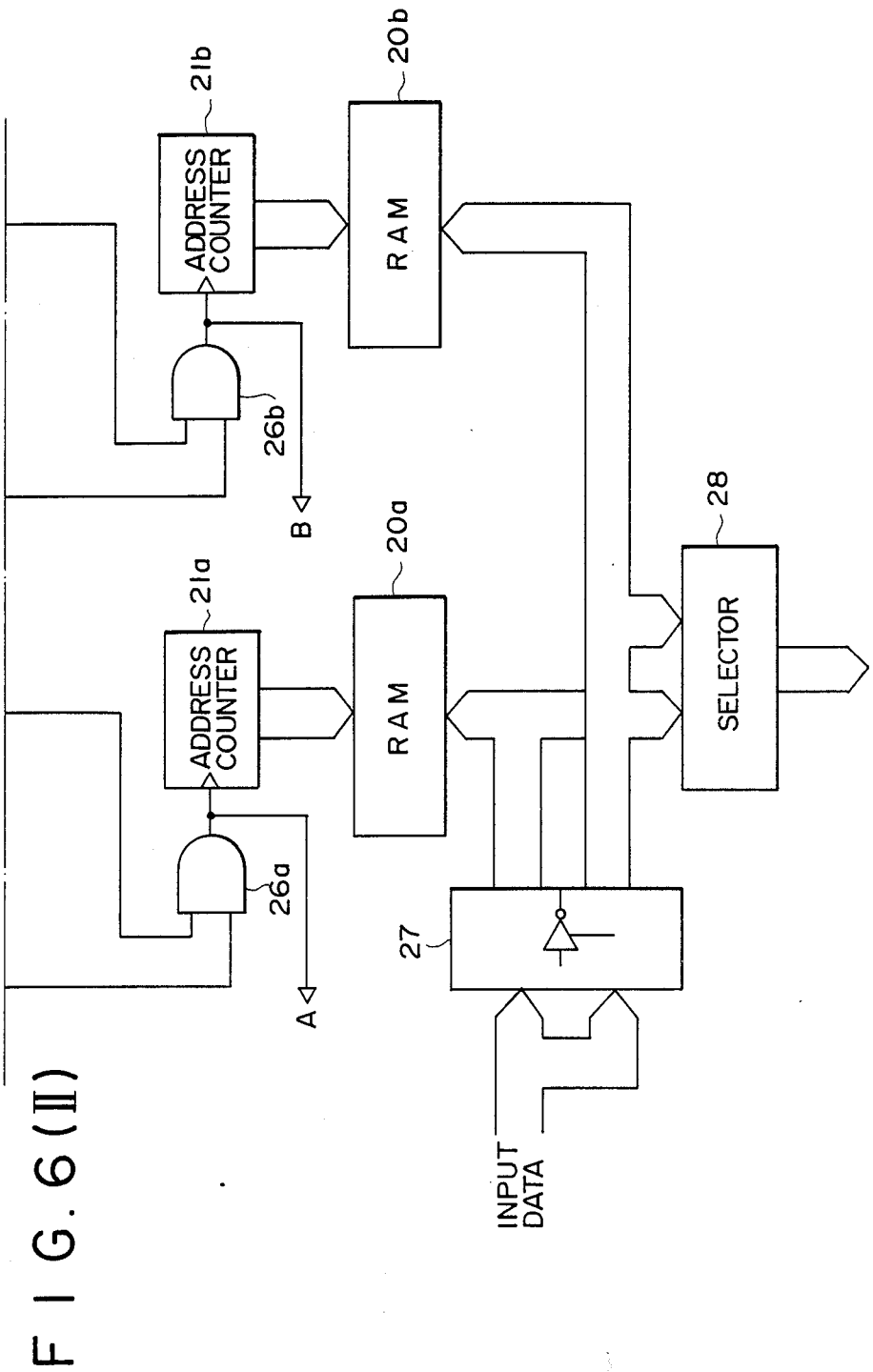

FIG. 6 illustrates mostly in blocks a magnification processing system suitable for use in the structure shown in FIG. 3. The illustrated magnification processing system includes a pair of toggle RAMs 20a and 20b, a pair of address counters 21a and 21b and a pair of magnification data ROMs 22a and 22b which supply clock signals to the address counters 21a and 21b, respectively. The magnification data ROMs 22a and 22b, store and output various magnification data to the associated address counters 21a and 21b in the form of clock signals. For example, in the case of unity magnification. i.e., the correspondence between an address and a data of each of RAMs 20a and 20b being 1:1, when the RAMs 20a and 20b operate in a write mode, the clock signals supplied to the address counters 21a and 21b have the image frequency of 24 MHz; on the other hand, while the RAMs 20a and 20b operate in a read out mode, a clock signal having the image frequency of 16 MHz is applied as an address of a RAM, so that the input data stored in the RAM 20a or 20b is output in accordance with the image frequency of the read out mode, whereby conversion of image frequency between input and output data is carried out with unity magnification. This corresponds to the case indicated by (X 1) in FIG. 7.

On the other hand, a reduction in size can be obtained if the image frequency of 24 MHz is thinned out during the write-in mode in the relationship between the address and the data for the RAMs 20a and 20b. For example, if a clock signal CLK is thinned out as in the case of CLK (X 0.5) in FIG. 7, during write mode, the address counter 21a or 21b receives a thinned out clock with respect to the original 24 MHz. On the other hand, the image data still corresponds to the clock signal of 24 MHz. Thus, for the case of magnification (X 0.5), as the address increases by +1, the image data advances by two, whereby data 1 corresponds to address 1 and data 3 corresponds to address 2, so that the image data written into the RAMs 20a and 20b are thinned out. Under the condition, when the image data thus stored in the RAMs 20a and 20b is read out using a clock signal of 16 MHz as supplied from the associated address counters 21a and 21b, there is obtained an output data having the image frequency of 16 MHz and the magnification of X 0.5. This corresponds to the case indicated by (X 0.5) in FIG. 7.

On the other hand, in the case of increasing the rate of magnification, i.e., enlargement in size, during write mode, image data is stored into the RAMs 20a and 20b using a clock of 24 MHz as a clock of the associated address counters 21a and 21b, and, then, during read mode, a clock having the image frequency of 16 MHz is thinned out before being applied to the associated address counters 21a and 21b. For example, if a clock signal CLK is thinned out as shown for clock CLK (X 2) in FIG. 7, during read mode, the address counters 21a and 21b supply a thinned-out clock to the associated RAMs 20a and 20b. However, since the image data stored in the RAMs 20a and 20b correspond to a clock of 16 MHz, if a read mode is carried out with CLK (X 2), as the address increases by +1, the same image data is output twice, so that the image data is enlarged in size.

In accordance with a magnification variation scheme of this aspect of the present invention, in a size reduction mode, i.e., magnification being smaller than unity, a write clock is thinned out from the original image frequency of 24 MHz and a read clock having the original image frequency of 16 MHz is applied; whereas, in a size enlargement mode, i.e., magnification being larger than unity, a read clock is thinned out from the original image frequency of 16 MHz and a write clock having the original image frequency of 24 MHz is used. In this manner, simply by thinning out a clock to be applied to the RAM 20a or 20b during a read mode or a write mode, the image data may be reduced or enlarged in size, i.e., magnification of image data being varied.

Figure 8:
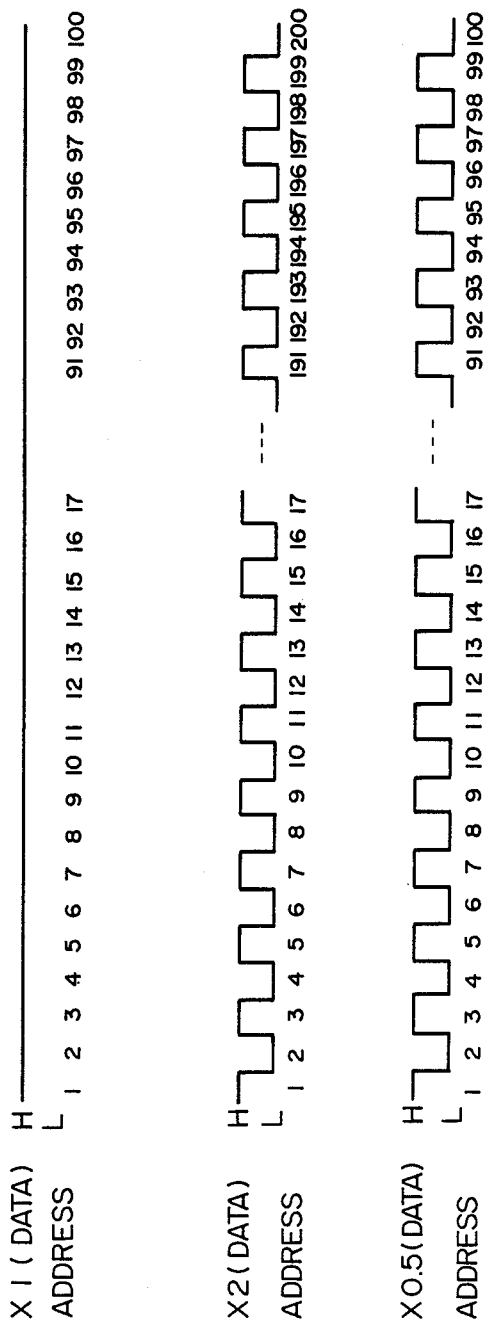
FIG. 8 is an illustration showing several examples of modification data stored in the magnification data ROM provided in the structure shown in FIG. 6.

In addition, in the above-described magnification processing system, switching between write and read clocks (24 MHz/16 MHz), is synchronized with switching between write and read modes of the toggle RAMs 20a and 20b. And, various magnification data are stored in the magnification data ROMs 22a and 22b. FIG. 8 illustrates magnification data stored in the magnification ROMs 22a and 22b. In the case of unity magnification, i.e., X 1, the data is all H, and this data is ANDed with a clock at gate 26a or 26b, so that a clock same as the clock applied to the gate 26a or 26b is applied to the address counter 21a or 21b. On the other hand, in the case of magnification of X 0.5, H and L appear alternately, so that 50 among 100 becomes H, so that when clock CLK is ANDed with this magnification data at gate 26a or 26b, there is obtained an address clock which is a half of the original clock CLK. Moreover, in the case of magnification of X 2, 100 among 200 become H, and when ANDed at gate 26a or 26b, there is obtained an address clock which is twice the original clock CLK.

It is to be noted that in the case of non-unity magnification, i.e., X 0.5 or X 2 in the above-described examples, switching of ROM data is carried out in association with switching between write and read modes of RAMs 20a and 20b. The magnification processing system shown in FIG. 6 also includes a pair of selectors 23a and 23b which serve to switch the upper address of the magnification data ROMs 22a and 22b, thereby switching ROM data between write and read modes. An initial data applied to each of the selectors 23a and 23b is so set to supply ROM data (all H) which causes the clocks applied to the address counters 21a and 21b become the original clocks. As may be understood from the above, size reduction or size enlargement can be carried out with 1% as a unit with size reduction data/100=size reduction clock in a size reduction mode, i.e, magnification being smaller than unity and 100/size enlargement data=size enlargement clock in a size enlargement mode, i.e., magnification being larger than unity.

Figure 9:
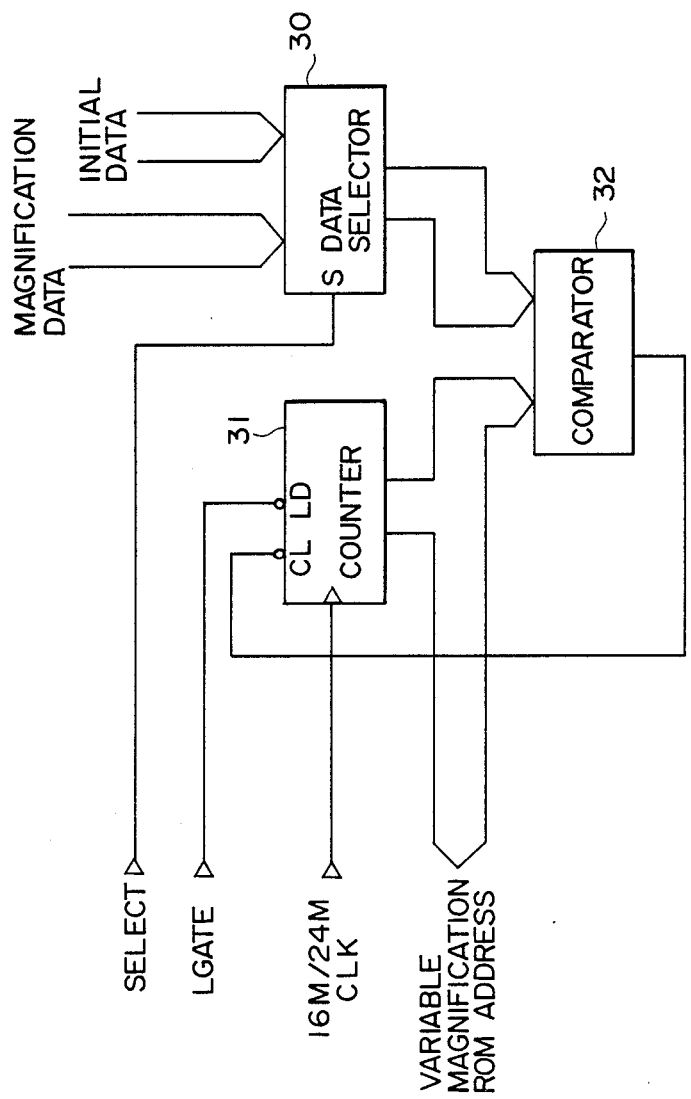
FIGS. 9 and 10 are block diagrams each showing an example of loop counter control unit suitable for use in the structure shown in FIG. 6.

The magnification processing system shown in FIG. 6 also includes a pair of loop counter controls 24a and 24b, a pair of latches 25a and 25b, a 3-state buffer 27 for switching input data into the RAMs 20a and 20b and an output data selector 28 for selecting data output from the RAMs 20a and 20b. FIG. 9 illustrates in block form the detailed structure of the loop counter control 24a or 24b of the associated magnification data ROM 22a or 22b. As shown in FIG. 9, the loop counter control 24a or 24b includes a data selector 30 which selects either a magnification data or an initial data (here, this is assumed to be 100) in accordance with a control signal indicating whether the magnification data is above 100 or less than 100. In the case where the magnification data indicates a value less than 100, i.e., a size reduction mode, since amount of thinning out data from the clock to the address counter 21a or 21b of the associated RAM 20a or 20b relative to the clock of the counter 31 is determined, an initial data is selected (in this case, a 100 loop counter is established). On the other hand, in the case of a size enlargement mode, if implemented in the same manner as in the case of size reduction mode, there results 100/enlargement data amount at the loop counter 31, which produces an error. Accordingly, in a size enlargement mode, if the enlargement data amount is always set at 100 as one loop enlargement data amount, there results enlargement data amount/100 and the clock of address counter 21a or 21b of the associated RAM 20a or 20b accurately agrees with the magnification.

As described above, in order to establish a 100 loop counter 31 in a size reduction mode and a loop counter with a size enlargement data amount in a size enlargement mode, the value of the counter 31 is compared with the value of the selector 30 at a comparator, and, if the value of the counter 31 has been found to be larger than the value of the selector 30, a clear signal of the counter 31 is output from the comparator 32 to thereby establish a loop counter. The output data of this counter 31 is coupled to a lower address of ROMs 22a and 22b.

Figure 10:
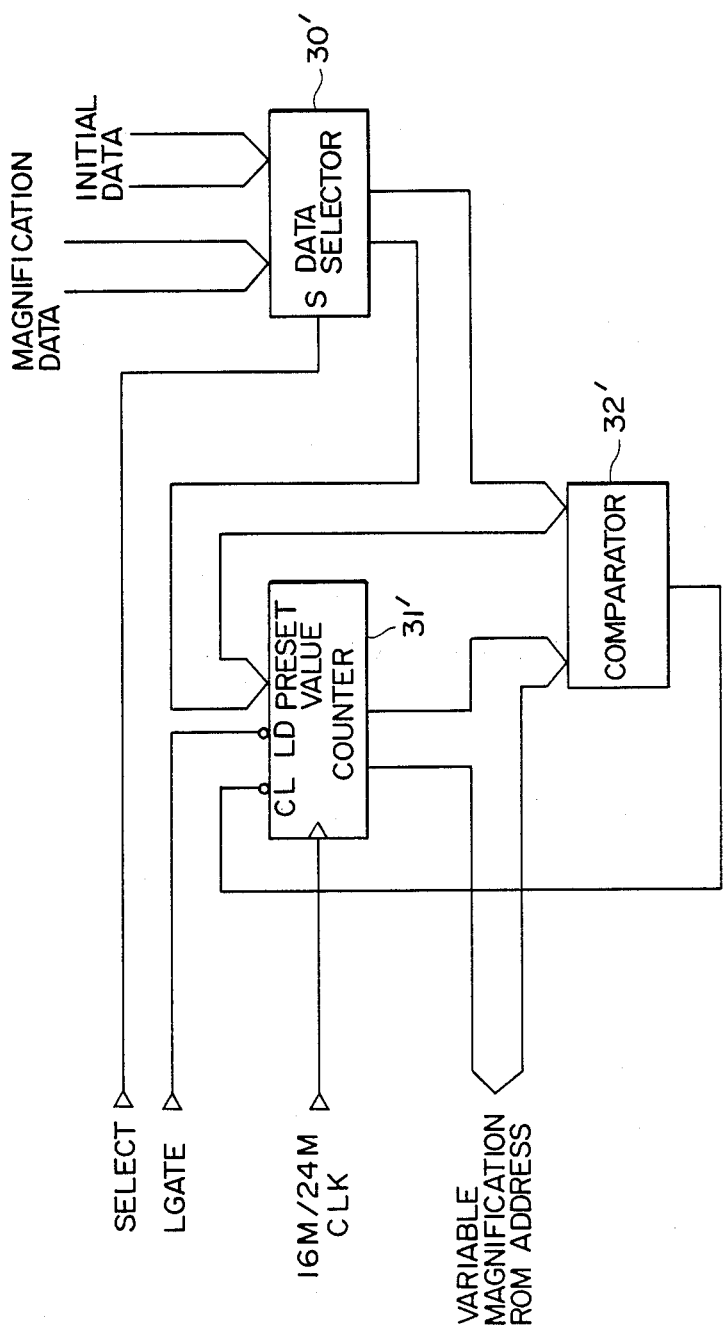
Figure 11:
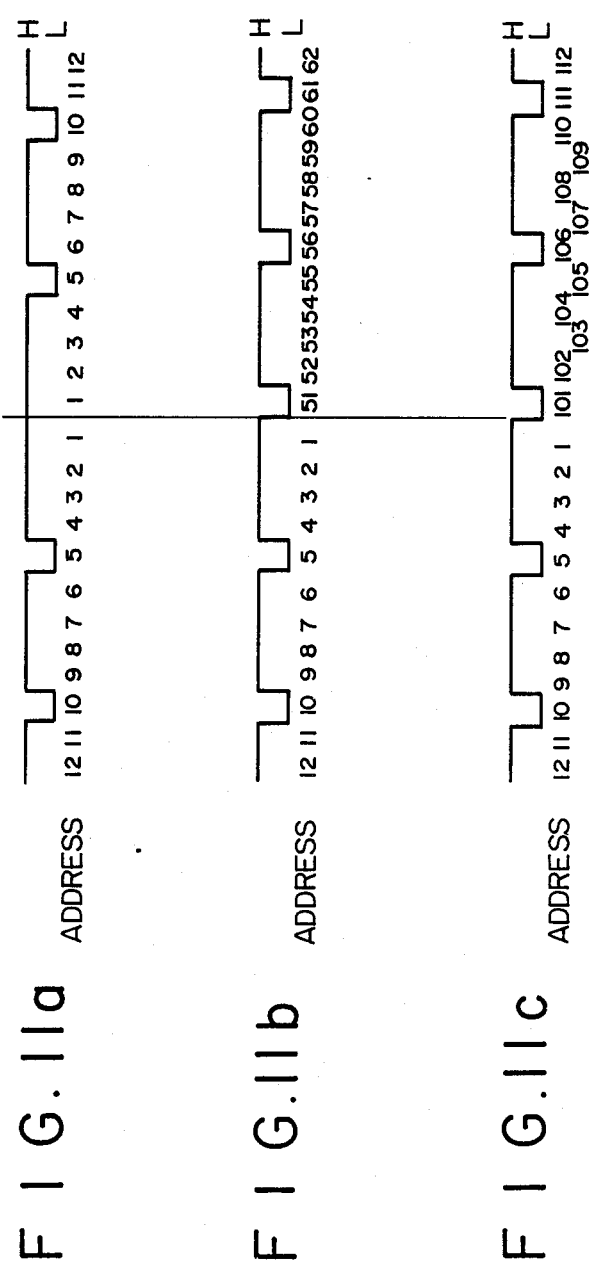
FIGS. 11a, 11b, and 11c are an illustration useful for understanding how image data divided into two line segments are reduced or enlarged in size using the magnification data ROM.

As described above, by providing ROM data in two lines and varying the contents of each ROM, change of magnification at a connection between segmented image data can be effected without any unnatural feeling. However, since the amount of data is enormous, it is quite time consuming. For this reason, if the contents of 2-line division ROM data were simply made identical, there would result signals as shown in FIG. 11, whereby a magnified section at a connection between segmented image dta would present an unnatural feeling. FIG. 11a shows simply identical ROM data, and FIGS. 11b and 11b show size reduction and size enlargement data, respectively. In order to cope with this problem, as shown in FIG. 10, a select signal of a data selector 30' is input into a preset counter 31' as a preset value. With this structure, during writing of a RAM in a size reduction mode, an output of a comparator 32' is input into the counter 31' as a clear signal when an initial data (here 100) has been supplied, and an output of the selector 30' is input into the counter 31' as a preset value when the initial data of $\frac{1}{2}$ has been output. It is only necessary to shift a bit for $\frac{1}{2}$, and the writing starts at 51st data as shown in FIG. 11b, so that a change of magnification can be effected for the connection portion without any unnatural feeling. Similarly, during reading of a RAM in a size enlargement mode, magnification data of $\frac{1}{2}$ is output and supplied as a preset value, and, thus, a change of modification can also be effected for the connection portion of segmented data without any unnatural feeling. As described above, in the case when ROM data are set identical between two line divisions, a change of magnification can be effected for the connection portion between segmented data without any unnatural feeling by providing a data selector 30' in the loop counter of one of the two lines.

As described above, in accordance with this aspect of the present invention, since the image data is divided into two segments at its center and one segment of image data is scanned in one direction with the other segment of image data scanned in the opposite direction, the same magnification processing scheme can be applied to each of the segments, which contributes to maintain the cost at low level. In addition, a change of magnification can be effected at the connection between the two segmented data without any unnatural feeling. Besides, the clock rate for advancing the image data can be maintained at a relatively low level, the data rate is prevented from becoming too high. Furthermore, the magnification processing can be carried out at high speed and thus in real time without requiring a complicated circuit. When the same magnification data ROM is used, the cost can be lowered and use may be made of a common circuit between the two divided sections.

Figure 12:
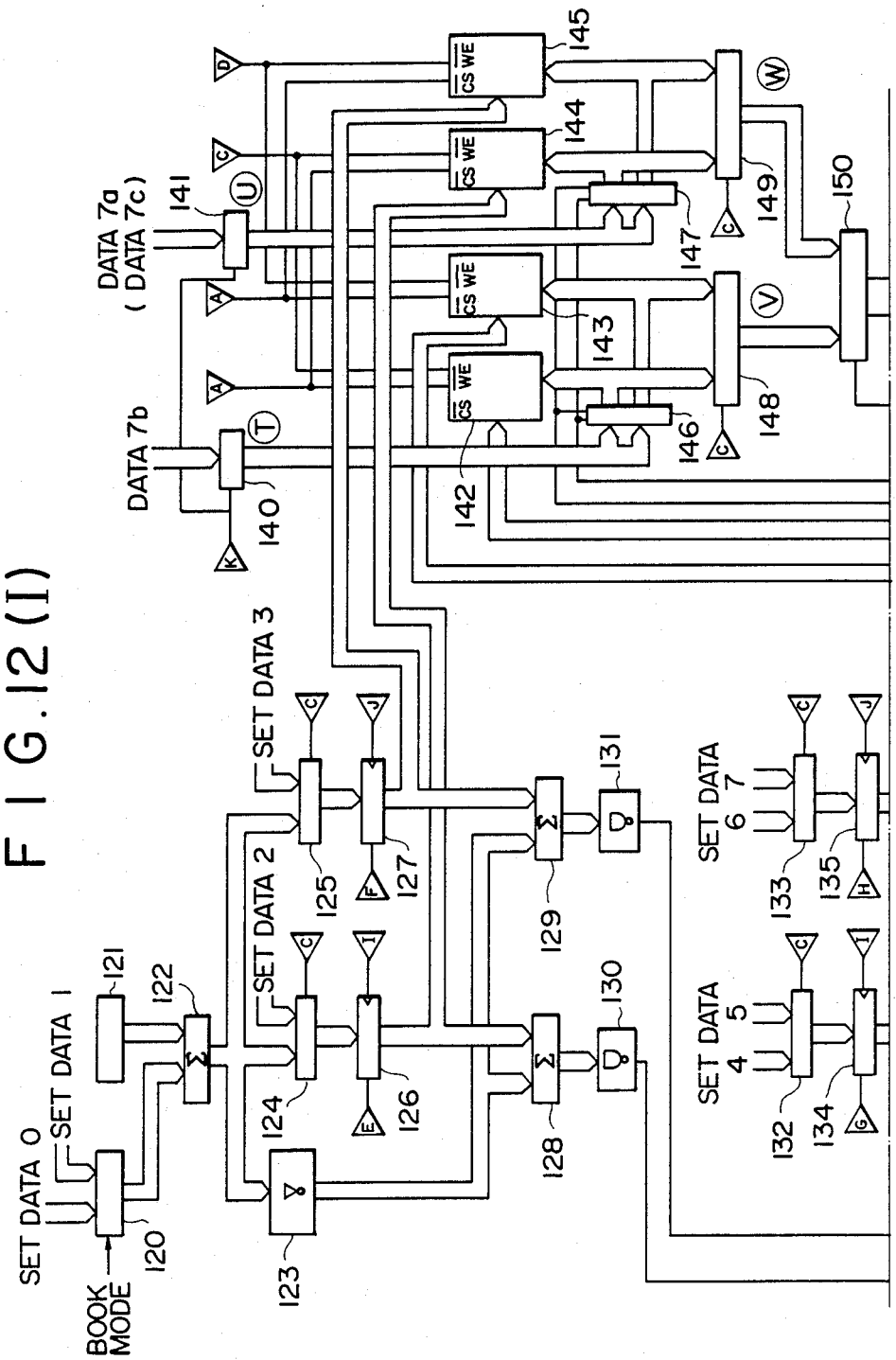
Figure 13A:
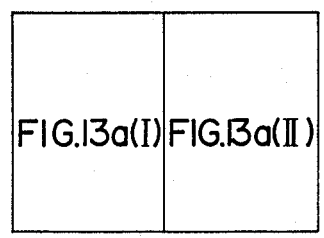
FIGS. 13a, 13a(I), 13a(II), 13b, 13b(I), 13b(II), 13b(III), and 13b(IV) are timing charts which are useful for understanding the operation of the structure shown in FIG. 12.

Now, referring to FIG. 12, another aspect of the present invention will be described below. FIG. 12 shows in block form and in logic symbols the detailed structure of the combination/separation up and down circuits 10a and 10b shown in FIG. 3 in accordance with this aspect of the present invention. As shown, the illustrated system includes a data selector 120, a dip switch 121, a summing unit 122, an inverter 123, data selectors 124 and 125, address counters 126 and 127, summing units 128 and 129, NAND gates 130 and 131, data selectors 132 and 133, address counters 134 and 135, NAND gates 136 and 137, a data selector 138, flip-flops 139, 140 and 141, toggle RAMs 142 through 145, 3-state buffers 146 and 147, data selectors 148 through 150, an inverter 151, flip-flops 152 through 155, AND gates 156 through 159 and a data selector 160. The operation of the system shown in FIG. 12 will now be described also with reference to the timing chart shown in FIGS. 13a and 13b.

(1) Combination/Separation Up Mode

Input data 7a and 7b are latched into flip-flops 140 and 141, respectively, and 3-state buffers 146 and 147 select data outputs from toggle RAM 142 or 143 and RAM 144 or 145. A selection signal is controlled by NAND gates 156 and 157 (control signals G and H in FIG. 13b). The 3-state buffers 146 and 147 allow an output when L is supplied thereto. Write and read control of the toggle RAMs 142 through 145 is carried out by CS and WE signals with CS signal controlling the write timing by the AND gates 158 and 159 (I and G in FIG. 13b) and a combination of CS and WE controlling the read timing (E, F, I and J in FIG. 13b). I and J signals of FIG. 13b, which are the control signals for CS, are obtained by taking an AND between a clock CLK1 after shifted by a delay circuit 154 and toggle mode signals E and F of the flip-flop 153. And, a clock to the flop-flop 143 is obtained by latching the beforementioned LGATE (FIG. 4) with a signal which has been inverted from CLK1 by the inverter 151 (regarding timing, see C, E and F in FIGS. 13a and 13b). A selection signal of the 3-state buffers 146 and 147 is a NAND output signal between E and F signals of the flip-flop 153 and an LGATE latch signal of the flip-flop 152.

Furthermore, the address counters of the toggle RAMS 142 through 145 are connected to the address counters 126, 127, 134 and 135, respectively. These toggle RAMs operate such that, if one RAM is in a write mode, the other RAM is set in a read mode. Here, the data being currently input is written into one RAM while the other RAM reads out the data which have been input in the previous step. The data selectors 148 and 149 select read out data from the toggle RAMs. A selection signal to be supplied to the data selectors 148 and 149 is controlled by an E signal of the flip-flop 153.

The address counters 134 and 135 of the RAMs 142 and 143 for carrying out read out and write in of data 7b are up-counters which can be preset, and they are controlled by count-up clock, count start and end control signals and initial count signal. The clock of the counter is controlled by an inverter output B of CLK1 and A of CLK2, and, as described previously, clock B is a clock which allows to process 5,000 pixels during a LSYNC period and clock A is a clock which allows to process 7,500 pixels during a LSYNC period.

In the first place, when the counter 134 is to effect the write address control of the RAM 142, as the clock of the counter 134, O signal of the data selector 160 is input, and this becomes clock B. At this time, the preset initial count value becomes 0 because the set data 4 at the data selector 132 is 0 (set data 5 is 2,498) and thus 0 output becomes the present value of the counter by selection signal C. The count start/end signal becomes C signal (LGATE latch signal) of the before-mentioned flip-flop 152 by the M signal of the data selector 160. Thus, 5,000 pixel data of data 7b is written into the RAM 142 from address 0 up to address 4,999 (T in FIG. 13b).

During writing operation of the RAM 142, the RAM 143 is in a read out mode, and when the counter 135 is in charge of read out address control of the RAM 143, as the clock of the counter 135, P signal of the data selector 160 is input, which becomes clock A. In this case, the present initial value becomes 2,498 because set data 7 at the data selector 133 is 2,498 (set data 6 is 0) and the output of 2,498 becomes the present value of the count by selection signal C. The count start/end signal is N signal of the data selector 60 and also D signal (LGATE, clock A latch signal) of the flip-flop 155. In this case, at 5,000th count, a signal from the NAND gate 137 becomes an output signal R of the data selector 138, which then becomes set signal Q of the flip-flop 139. The RAMs 142 and 143 repeat the above-described operation for the following image lines.

While the counter 134 is in a read out mode, a signal from the NAND gate 136 becomes output signal R of the data selector 138 which then becomes set signal Q of the flip-flop 139. In addition, during read out mode, the address starts from 2,498 so as to divide the data from the center image sensor (CCD) 7b into two segments at its center, and this combination/separation up mode is set in up-count mode because it is same in direction as the main scanning direction.

The address counters 126 and 127 of the RAMs 144 and 145 for carrying out write in and read out of data 7a are up-counters which can be preset, and they are controlled by count-up clock, count start/end control signal, and initial count signal. The clock of the counters is controlled by inverted output B of CLK 1 and CLK2 A. In the first place, while the counter 126 is in charge of write address control of the RAM 144, as the clock of the counter 126, O signal of the data selector 160 is input, which becomes clock B. In this case, the present initial count value starts from 0. This is because set data 2 of the data selector 124 is 0 (the other input value of the data selector 124 being x value for adjustment of an overlapping amount) and 0 output becomes the present value of the counter by selection signal C. The counter start/end signal is signal K of the data selector 160 and it becomes signal C (LGATE latch signal) of the before-mentioned flip-flop 152. Thus, 5,000 pixel data of data 7a is written into the RAM 142 from address 0 to address 4,999 (U in FIG. 13b).

While the RAM 144 is in a write mode, the RAM 145 is set in a read mode, so that, when the counter 127 is in charge of read address control of the RAM 145, as the clock of the counter 127, signal P of the data selector is input, which becomes clock A. In this case, the present initial value becomes the overlapping amount x, which has the value selected by the data selector 125 (set data 3 is 0), because output x become the preset value of the counter by selection signal C. The count start/end signal is signal L of the data selector 160, and, when the count value becomes x+4,836 at the time when the count starts by a set signal of the flip-flop 139, a reset signal S of the flip-flop 139 is output and the count is terminated by output Q of the flip-flop 139. With this output Q, the output data of the data selector 140 is selected with x being output. The RAMs 144 and 145 repeat the above-described operation for the following image lines It is to be noted that the structure is simplified and the adjusting operation is eased by structuring such that the overlapping amount between data 7a and data 7b is adjusted only by data 7a. Such an adjustment operation can be carried out, for example, by an external measuring equipment, such as an oscilloscope, or the dip switch 121. Furthermore, since the valid data of data 7a is set at 4,836 pixel data (the reason therefor has been described above), correction value x for the overlapping amount of the dip switch 121 may be regarded as an offset value; for this reason, by taking a sum between an inverter output of the output of the dip switch 121 for the overlapping amount correction value and the count value, i.e., $x+4,836-x=4,836$, the count of 4,836 is determined as an output data of the summing unit 128, so that its signal is subjected to NAND to determine the read out count of data 7a, which is set as the reset value of the flip-flop 39 of the read out counter.

(2) Combination/Separation Down Mode

Since the RAM write operation of this mode is identical to the RAM write operation of the previously described combination/separation up mode, its detailed description will be omitted. However, the counter is an up/down counter and it serves as an up-counter during write mode.

Next, the RAM read out operation of this combination/separation down mode will be described in detail below.

In the case of data 7b, while the RAM 142 is in a write mode, the RAM 143 is in a read mode, and while the counter 135 is in charge of the read address control of the RAM 143, as the clock of the counter 135, signal P of the data selector 160 is input, which becomes clock A. In this case, the present initial value becomes 2,500 because the set data at the data selector 133 is 2,500 (set data 6 is 0) and the output of 2,500 becomes the preset value of the count by selection signal C. The count start/end signal is signal N of the data selector 160 and also signal D of the before-mentioned flip-flop 155 (LGATE, clock A latch signal). In addition, since the counter 135 is an up/down counter, it is set as a down counter during read mode by up/down control signal C. In this case, at 0 count−1, the signal from the NAND gate 137 becomes output signal R of the data selector 138, which then becomes set signal Q of the flip-flop 139. In this case, the operation of the RAMs 142 and 143 is in a toggle operation mode. Further, during read mode, the address starts from 2,500 so as to divide the image data from the center CCD (7b of FIG. 2) at its center, and since this combination/separation down mode is in the direction opposite to the main scanning direction, a down count mode has been applied.

In the case of data 7c, similarly, while the RAM 144 is in a write mode, the RAM 145 is in a read mode, and while the counter 127 is in charge of the read address control of the RAM 145, as the clock of the counter 127, signal P of the data selector 160 is input, which becomes clock A. In this case, the preset initial value becomes $y+4,836$ (overlapping amount y), which takes the value selected by the data selector 125 (set data 3 is 0), because $y+4,836$ becomes the preset value of the counter by selector signal C. The count start/end signal is signal L of the data selector 160, and when the count start count value becomes y by the set signal of the before-mentioned flip-flop 139, reset signal S of the flip-flop 139 is output and and it is terminated by output Q of the flip-flop 139. With this output Q, the output data of the data selector 150 is selected and signal X is output. Since the counter 127 is an up/down counter, it is set as a down-counter during read mode by up/down control signal C. In this case, the operation of the RAMs 144 and 145 is in a toggle mode of operation.

In addition, there is provided a simplified structure with ease in adjustment in which the overlapping amount of data 7b and 7c is adjusted only by data 7c. Such an adjustment can be carried out by an external measuring equipment, such as an oscilloscope, or the dip switch 121 with an image through a connection to a printer. Since the valid data of data 7c is set a 4,836 pixel data (the reason therefor having been described above), a correction value y of the overlapping amount of the dip switch 121 may be regarded as an offset value, and, for this reason, by making overlapping amount correction value $y+4,836$ pixel as an output of the dip switch 121 and taking a sum of its inverter output and the count value (i.e., $y+4,836-4,836=y$), this count of 4,836 is determined as an output data of the summing unit 128, so that this signal is subjected to a NAND operation to determine the read out count of data 7c, which is then set as the reset value of the flip-flop 139 of the read out counter.

Figure 20:
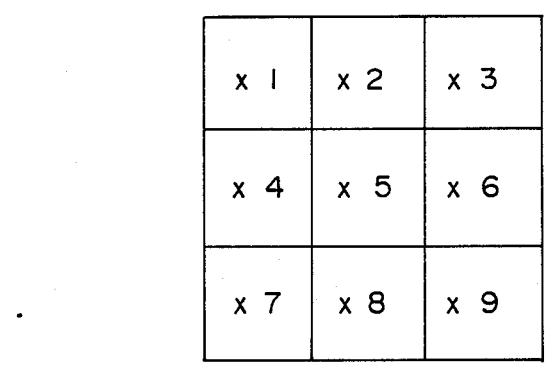

Then, as a post-processing step of the combination/-separation up circuit 10a and the combination/separation down circuit 10b, the image information output from the circuits 10a and 10b is processed in a digital processing unit which follows the circuits 10a and 10b. As a digital filter to be used in this post-processing step, it is conceivable to use a low pass filter, a high pass filter, or a bandpass filter. For example, as a filter, it is conceivable to use a digital filter of $3\times3$ matrix as illustrated in FIG. 20. In this matrix shown in FIG. 20, X5 is a pixel of interest and the remaining X1 through X4 and X6 and X9 are peripheral pixels. If it is so structured that the peripheral pixels of the pixel of interest to be processed in the filter are taken into consideration and also the previous density of an image of interest in image recognition is also taken into consideration and also the previous density of an image of interest in image recognition is also taken into consideration, when the image data is divided into two lines of combination/separation up and down modes as shown in FIG. 3, a predetermined number of pixels may be overlapped at the dividing point, thereby allowing to add pixels which are necessary for the subsequent processing in each line, so that no problem arises in the subsequent processing.

As described previously, the circuits 11a and 11b shown in FIG. 3 and constructed in accordance with this aspect of the present invention includes various processing units, such as an image processing unit, a magnification processing unit and an image binary conversion processing unit, and the circuits 11a and 11b process the image data divided into two segments as supplied from the combination/separation up and down circuits 10a and 10b, respectively. At this juncture, the image overlapping data at the central portion is used, and the valid data is $2,500-4,999(x)-x+4,836$ for the output of circuit 11a and $y-y+4,836(0)-2,499$ for the output of circuit 11b. As shown in FIG. 3, it is to be noted that a combination processing circuit 12 is provided as connected to the circuits 11a and 11b in accordance with this aspect of the present invention. Thus, the outputs from the circuits 11a and 11b are input into the combination processing circuit 12.

As described previously, the image data from the three image sensors 7a through 7c is divided into two segments, i.e., left and right half segments, at the center of the central image sensor 7b, and each of the circuits 11a and 11b processes the image data of 7,500 pixels during a scan period defined by the scanning sync signal. At the combination processing unit 12, the data for connection processing of the circuits 11a and 11b are combined during $2\times$ scan period and the processing is carried out for two lines at the same time. A two line output is provided so as to match an interface of an image output unit, such as a printer, as will be described more in detail later.

Now, the image data of the circuit 11b has been obtained by scanning an original in the opposite direction in the main scanning direction from the image center, so that it is necessary to rearrange the image data in accordance with the forward direction in the main scanning direction. In FIG. 16, image data X' indicates an image signal which has been obtained by scanning in the opposite direction in the main scanning direction from the image center and it is input into a toggle RAM 240. The address under the condition is controlled as being up-counted by an address counter 241 and the image data is written into the RAM 240. In this case, the preset value of the up count is "1." The RAM 240 is a toggle RAM, so that, while one is in a write mode, the other in a read mode. And, during read mode, the address of the RAM 240 is down-counted. In this case, the preset value for this down count becomes 7,336 $(2,500-0(y+4,636)-y)$ and it is output as X" shown in the timing chart of FIG. 13b. This X" becomes output data 3 shown in FIG. 15. Similarly, image data V' is a data which has been divided at the central portion in the main scanning direction, and it is input into the RAM 240. And, the address counter under the condition carries out up count with the preset value being "1." And, even during read mode, the address counter serves as an up counter with the preset value being "1", whereby it is delayed by one line in the auxiliary scanning direction, thereby matching with X" in the auxiliary scanning direction. Under the circumstances, the image data which has been divided into two segments is output at the same time as far as the main scanning direction is concerned, and then it proceeds to the next step.

Figure 14I:
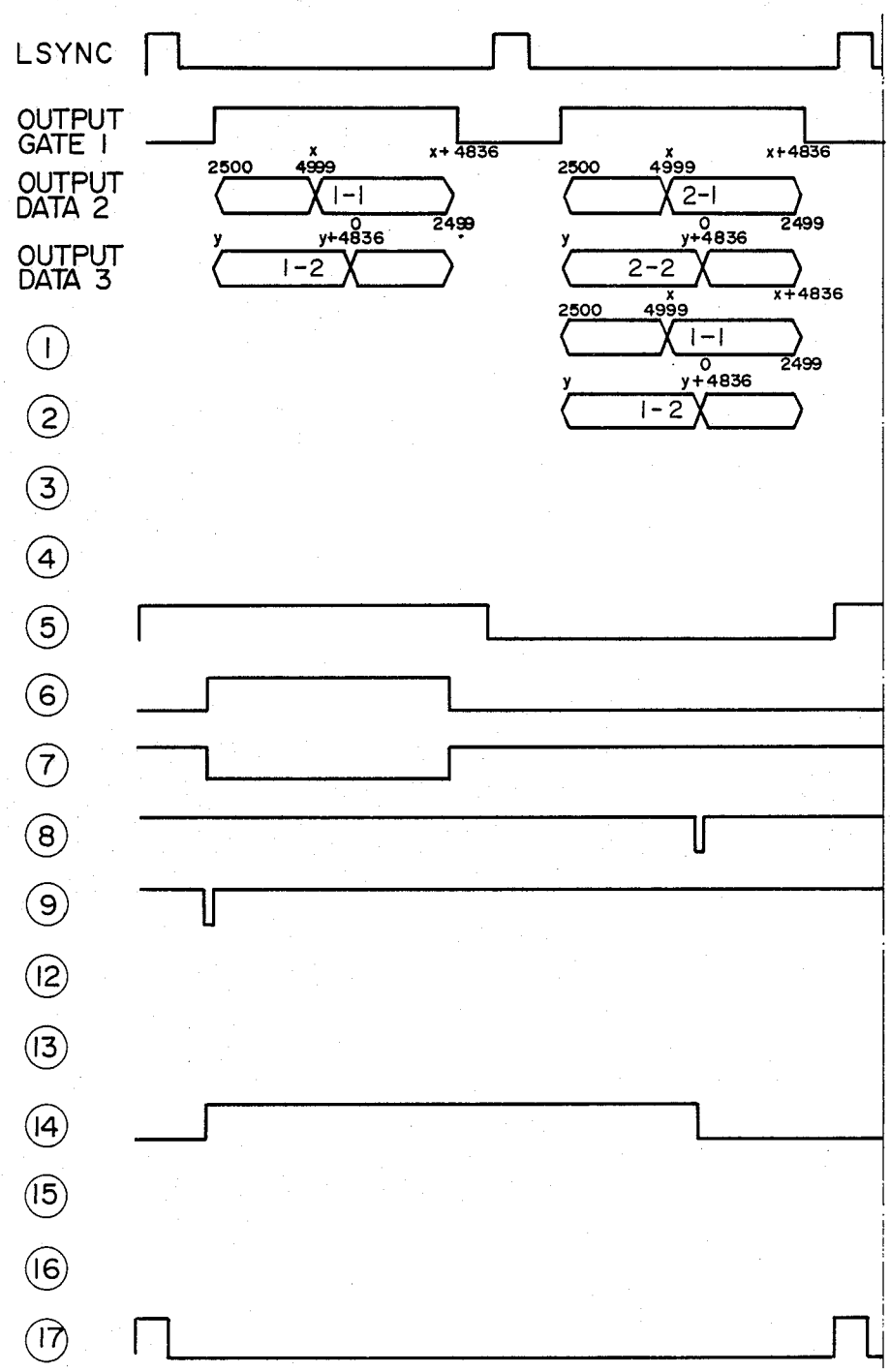
FIGS. 14, 14(I), 14(II), and 14(III) are a timing chart which is useful for understanding the operation of the structure shown in FIG. 15.
Figure 14:
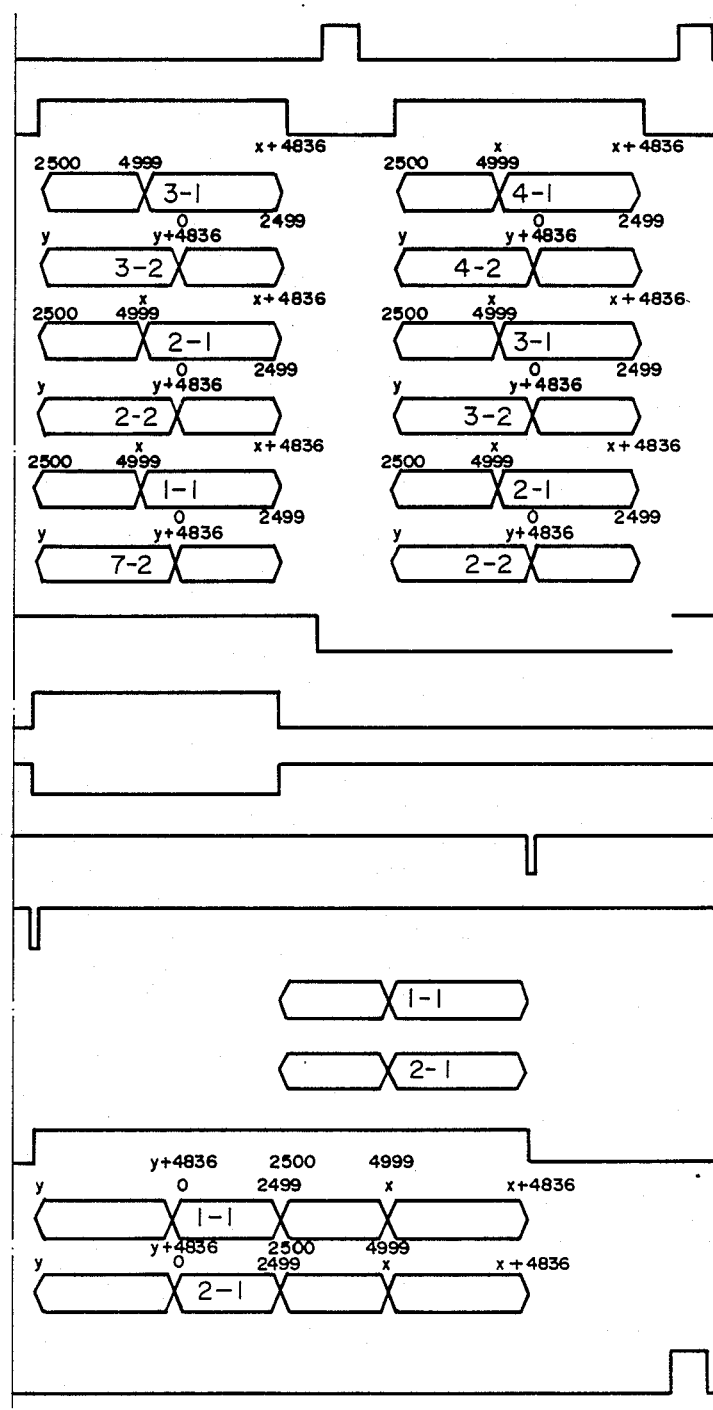
Figure 15I:
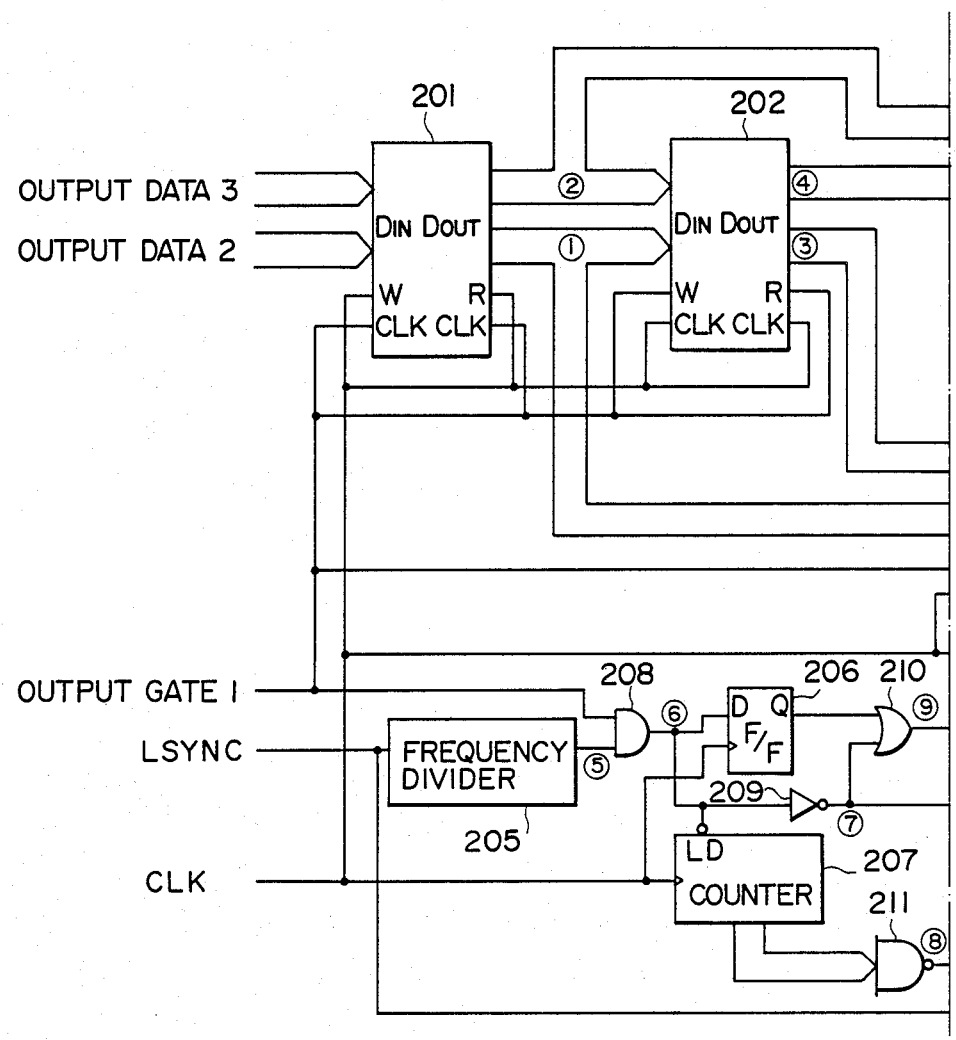
FIGS. 15, 15(I), 15(II), and 16 are block diagrams showing a system for producing two parallel lines of image data, each line including image data of alternate scan lines in succession.
Figure 15:
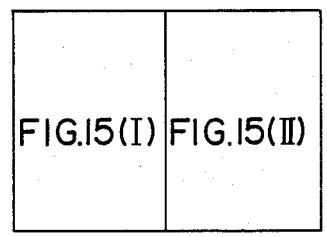

Described more in detail in this connection with reference to FIGS. 14 and 15, there are provided three first-in-first-out (FIFO) memories 201 through 203 as shown in FIG. 15. In each of these FIFO memories 201 through 203, those image data which has been input in the first place is output in the first place, and input (write) and output (read) modes are reset by W (write) and R (read) control signals, whereby write and read opreations are carried out by clock CLK in synchronism with image data. Referring now to FIG. 14, a pair of image data which has been divided into left-half and right-half segments, i.e., output data 2 and output data 3, is controlled as valid data by an output gate 1 and input into the FIFO memory 201. In this case, from the memory 201 is output LSYNC data (1 and 2), and the output data (1 and 2), from the FIFO memory 201 is input into the FIFO memory 202; on the other hand, output data (2) is input from the selector 203 at the same time and output data (1) is input into the FIFO memory 204. When image data (1) and 2 are input into the FIFO memory 202, the output data is output as data (3) and (4) in synchronism with output gate 1. Output data (4) is input into the selector 203 at its input 4; on the other hand, output data (3) is input into a FIFO memory 204. Here, W and R of FIFO memory 201, W and R of FIFO memory 204 and W of FIFO memory 204 are input and output in synchronism with output gate 1.

Signal R of the FIFO memory 204 is controlled by signal (7) which is an inverted signal of data (6) by an inverter 209, which, in turn, is obtained as a result of AND between a frequency-divided LSYNC signal (5) and output gate 1 at an AND gate 208, and this signal (7) is also input into the selector 203 as a select signal. That is, regarding image data to be input into the selector 203, at the third output gate of FIG. 14, the data of y—y+4,836 (0)—2,499 of 1—1 and 2—2 is input as A, and, when the output gate becomes low, the data of 2,500—4,999 (x)—x+4,836 of 1-1 and 1-2 is input as B. Thus, with the select signal (7), image data is output as 2-line output data from the selector 203 during 2× scanning sync signal period. A gate signal for determining a valid data length of this 2-line output data is formed by a counter 207 and it becomes a reset signal for a flip-flop 212 through a NAND gate 211 when the count of the counter 207 has reached a predetermined value. On the other hand, a set signal of the flip-flop 212 includes data 9, which is formed by the flip-flop 206, inverter 209 and OR gate 210, and data 14. In addition, the scanning sync signal has been described as LSYNC so far, it is converted into 2× scanning sync signal through an AND gate 213. With this, during LSYNC period, the image frequency is reduced to ½ as compared with the case of handling all of the pixels, and this image frequency corresponds to the image frequency when one line image data is divided into left and right half segments. In addition, as described before, the disadvantages of the two-division processing can be obviated.

As may be understood from the above description, in accordance with this aspect of the present invention, when converting into two line data during 2× LSYNC period, in the first place, one line image data is divided into two segments during LSYNC period. Alternatively, in the first place, during LSYNC period, image data from two image sensors are integrated, and, thereafter, it is divided into two line data. It is to be noted, however, that, in the former case, the image frequency remains low as compared with the case in which all of image data is processed during LSYNC period; on the other hand, in the latter case, the image frequency becomes higher while integrating image data from two image sensors during LSYCN period. It is also possible to form two line data during 2× LSYNC period or three line data during 3× LSYNC period so as to maintain the image frequency at a low level.

In the case where an image output unit, such as a printer, is of the two line output type, matching of interface may be obtained by making the output data from an image reading unit as two line output, and, thus, a connection may be established with ease. The reason why the image output unit is of the two line output is based on the fact that one line output is limited in the reduction of image frequency at a printer or in increasing the printer output speed, and this originates from the problem associated with the driving frequency of a semiconductor laser or the number of revolution of a polygon mirror driver motor. For this reason, in accordance with this aspect of the present invention, image data is output in two lines, which corresponds to the case in which two semiconductor lasers are activated in parallel to produce two light beams, each carrying image information of a corresponding scan line. Thus, depending on the number of lines of data desired by the image output unit, the combination circuit 12 may output image data in the corresponding number of lines of data.

Accordingly, in accordance with this aspect of the present invention, (1) matching between an image reading unit and an image outputting unit can be obtained with ease; (2) a connection operation between segmented image data between two adjacent image sensors in an image reading unit using a plurality of image sensors can be carried out with ease; and (3) the frequency conversion of an image information signal in implementing a connection adjustment operation between two adjacent image sensors can be carried out with ease.

Figure 17:
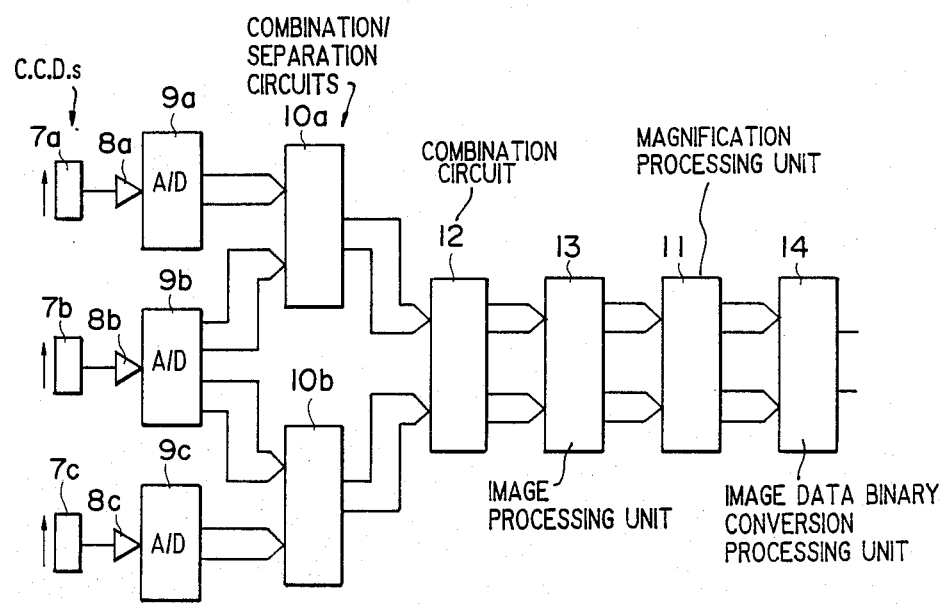
FIG. 17 is a block diagram showing an image processing system using multiple image sensors constructed in accordance with a further embodiment of the present invention.
Figure 18I:
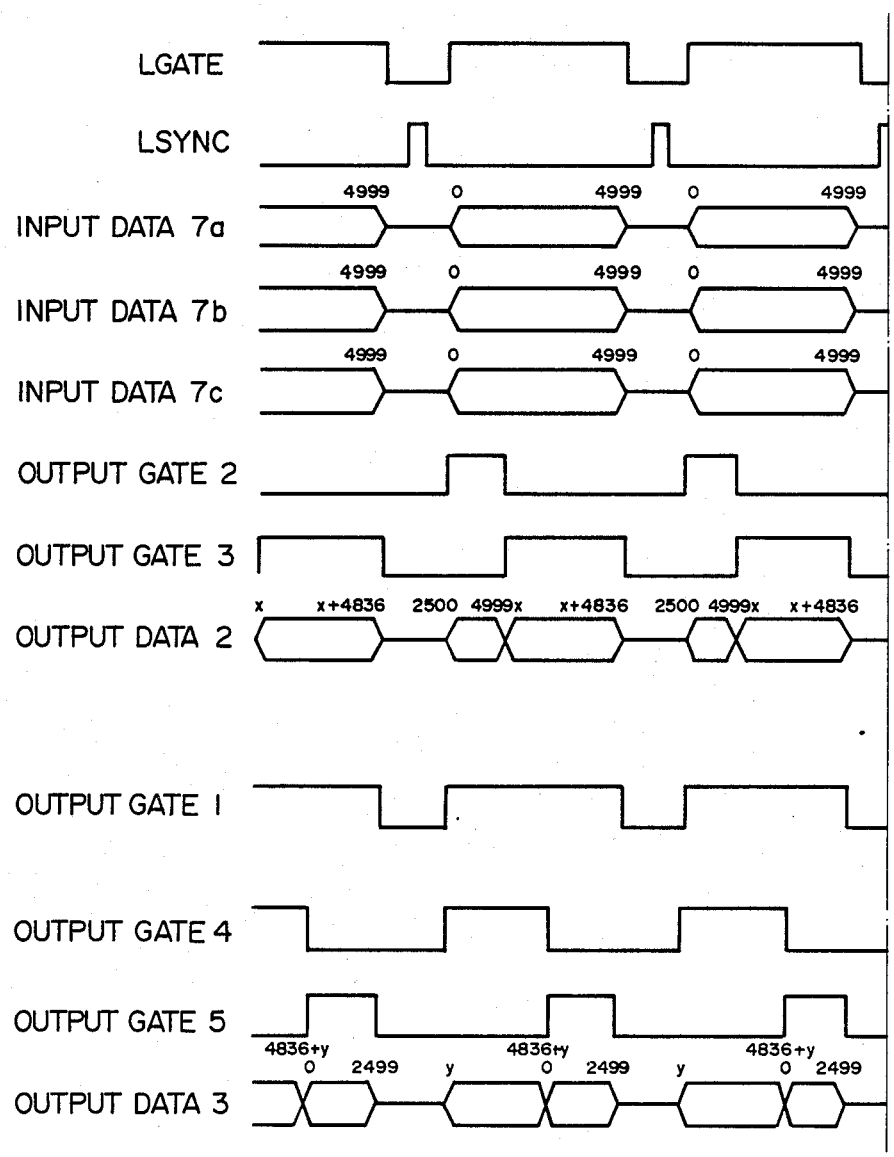
Figure 19A:
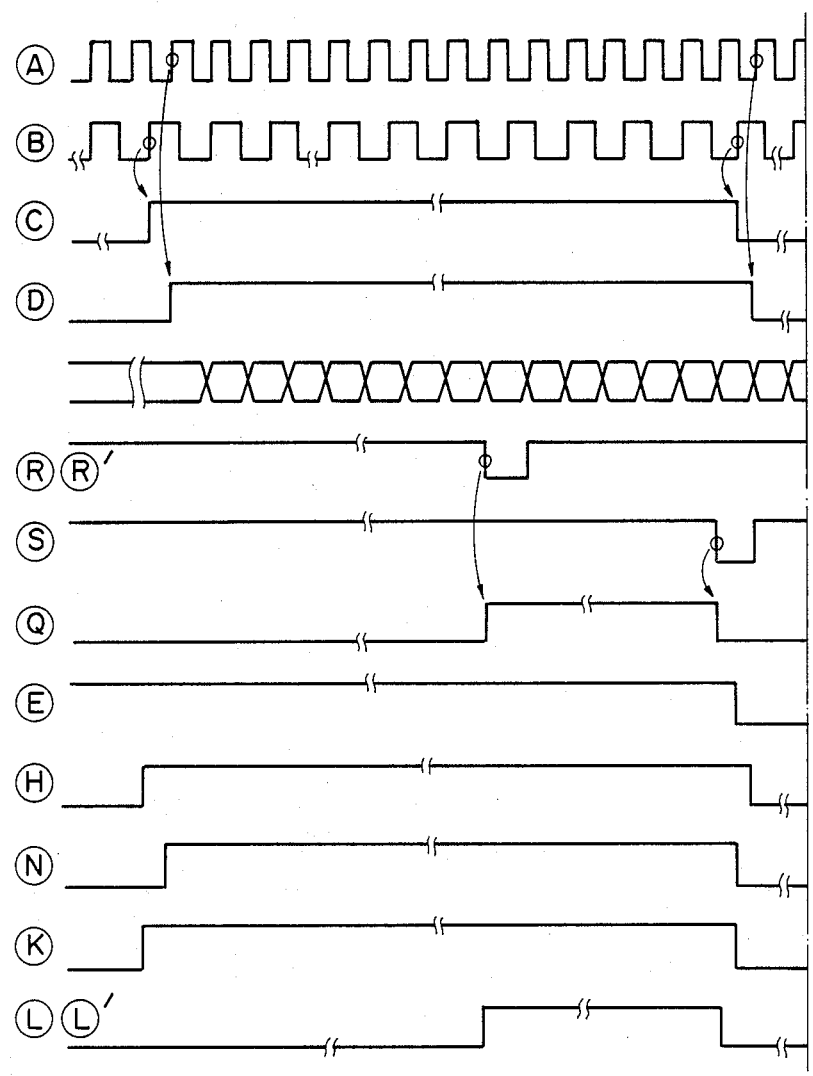
FIGS. 19a, 19a(I), 19a(II), 19b, 19b(I), 19b(II), 19b(III), and 19b(IV) are timing charts which are useful for understanding the operation of the structure shown in FIG. 12.
Figure 19A:
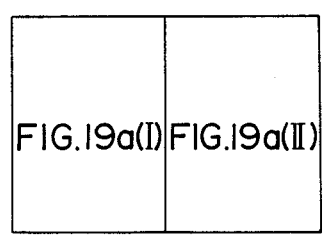

FIG. 17 shows in block diagram an image processing system using a plurality of image sensors constructed in accordance with a still further aspect of the present invention. In the structure shown in FIG. 17, the combination/separation up and down circuits 10a and 10b are connected to the combination circuit 12 which is turn is connected to an image processing unit 13. And, the image processing unit 13 is connected to the magnification processing unit 11 which in turn is connected to an image data binary conversion processing unit 14. The present system shown in FIG. 17 is very similar to the embodiments described above and the operation of the system shown in FIG. 17 will be self-explanatory once reference is made to FIGS. 18, 19a and 19b. In short, similar to the previously described embodiments, in accordance with the present system shown in FIG. 17, the image data obtained by the three image sensors 7a through 7c by optically reading an original is divided into two segments, i.e., left-half and right-half segments, from the image center and the image data of 7,500 pixels is processed during the scanning sync signal period. And, then, the data for each connecting portion from the separation up and down circuits 10a and 10b is combined at the combination processing circuit 12 during 2× scanning sync signal period at the same time for each of two lines.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An image processing method comprising the steps of:
   optically reading an original image line by line using a first plurality of image sensors at the same time to produce a first plurality of image data segments, each of said first plurality of image sensors optically reading a corresponding segment of a line of said original image;
   processing said first plurality of image data segments to produce a second plurality of image data segments;
   subjecting said second plurality of image data segments to a predetermined image data processing operation; and
   combining said second plurality of image data segments into one line of image data.

2. The method of claim 1, wherein said first plurality of image sensors are arranged in a line extending in a direction perpendicular to a direction in which said original image is transported.

3. The method of claim 1, wherein said second plurality is smaller in number than said first plurality.

4. The method of claim 3, wherein said second plurality is two in number, and said second plurality image data segments are left-half and right-half image data segments which respectively correspond to left-half and right-half segments of one line of said original image.

5. The method of claim 4, wherein said left-half and right-half image data segments are scanned in opposite directions.

6. The method of claim 1, wherein said predetermined image data processing operation is a change of image magnification.

7. An image processing method comprising the steps of:
   optically reading one line of an original image using a first plurality of image sensors at the same time to produce a first plurality of image data segments, each of said first plurality of image sensors optically reading a corresponding segment of the one line of said original image;
   processing said first plurality of image data segments for the one line to produce a second plurality of image data segments for the one line;
   combining said second plurality of image data segments into one line of image data;
   repeating the above-described steps for succeeding image lines of said original image to produce a predetermined number of parallel lines of image data; and
   subjecting said predetermined number of parallel lines of image data to a predetermined image data processing operation.

8. An image processing system comprising:
   a first plurality of image sensors for optically reading an original to produce image data line by line, said first plurality of image sensors reading a line of said original at the same time in a forward direction along said line;
   first storing means for storing said image data produced by said first plurality of image sensors at respective storage locations each defined by an address;
   second storing means for storing image magnification data; and
   write/read control means for producing addresses to address the storage locations of said first storing means and for controlling a write/read operation of said first storing means;
   wherein said image magnification data is supplied to said write/read control means as a clock signal to vary the address of said first storing means as produced by said write/read control means in a write mode and a read mode of said first storing means.

9. The system of claim 8, wherein said first storing means includes a pair of image memories, wherein one of said image memories stores image data corresponding to a left half of said line and the other of said image members stores image data corresponding to a right half of said line.

10. The system of claim 8, wherein said magnification data includes data indicating unity magnification, size reduction and size enlargement.

* * * * *